United States Patent
Watanabe et al.

(10) Patent No.: US 9,476,728 B2
(45) Date of Patent: Oct. 25, 2016

(54) NAVIGATION APPARATUS, METHOD AND PROGRAM

(75) Inventors: Keisuke Watanabe, Tokyo (JP); Yuki Furumoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/114,877

(22) PCT Filed: Oct. 12, 2011

(86) PCT No.: PCT/JP2011/005715
§ 371 (c)(1),
(2), (4) Date: Oct. 30, 2013

(87) PCT Pub. No.: WO2013/054375
PCT Pub. Date: Apr. 18, 2013

(65) Prior Publication Data
US 2014/0067258 A1    Mar. 6, 2014

(51) Int. Cl.
*G01C 21/36* (2006.01)

(52) U.S. Cl.
CPC ....... *G01C 21/3629* (2013.01); *G01C 21/3608* (2013.01); *G01C 21/3641* (2013.01)

(58) Field of Classification Search
CPC .......... G01C 21/3608; G01C 21/3641; G01C 21/3629
USPC ................................................ 701/425–430
See application file for complete search history.

(56) References Cited

U.S. PATENT DOCUMENTS

| | | | |
|---|---|---|---|
| 6,163,750 A * | 12/2000 | Nojima ......................... | 701/443 |
| 6,226,590 B1 * | 5/2001 | Fukaya .................. | G01C 21/34 |
| | | | 701/428 |
| 2002/0010543 A1 | 1/2002 | Watanabe et al. | |
| 2004/0176906 A1 * | 9/2004 | Matsubara et al. .......... | 701/200 |
| 2007/0185644 A1 * | 8/2007 | Hirose ............... | G01C 21/3626 |
| | | | 701/532 |
| 2008/0249711 A1 | 10/2008 | Matsuda | |
| 2010/0198093 A1 | 8/2010 | Katayama et al. | |
| 2014/0074473 A1 | 3/2014 | Takei et al. | |

FOREIGN PATENT DOCUMENTS

| | | |
|---|---|---|
| DE | 112011105614 T5 | 6/2014 |
| JP | 9-206329 A | 8/1997 |
| JP | 2001-324345 A | 11/2001 |
| JP | 2003-329463 A | 11/2003 |
| JP | 2003-329476 A | 11/2003 |
| JP | 2006-284677 A | 10/2006 |
| JP | 2008-157885 A | 7/2008 |
| JP | 2009-192489 A | 8/2009 |
| JP | 2010-190773 A | 9/2010 |
| JP | 2010-204637 A | 9/2010 |
| JP | 2010-211536 A | 9/2010 |

* cited by examiner

*Primary Examiner* — Nga X Nguyen
(74) *Attorney, Agent, or Firm* — Birch, Stewart, Kolasch & Birch, LLP

(57) ABSTRACT

A navigation apparatus, method or program extracts only a guide expression a talker such as a fellow passenger says to a driver, and outputs a presentation content which corresponds to the guide expression. Accordingly, the driver can understand the content intuitively. This makes it possible to prevent the misunderstanding of the driver and to prevent a vehicle from going in the direction the talker does not intend.

13 Claims, 27 Drawing Sheets

FIG.2

| Timing | Place | Direction |
| --- | --- | --- |
| Immediately | 200 Meters Ahead | Turn Right |
| A Little Later | Next Intersection | West |
| ⋮ | ⋮ | ⋮ |

FIG.3

| Guide Expression | Graphics Expression | Text Expression | Color of Road | Thickness of Road |
| --- | --- | --- | --- | --- |
| Turn Right | Graphics Expression of Right Arrow | Text Data of "Turn Right" | Red | XX Dots |
| To The Right | | | | |
| Right | | | | |
| Turn Left | Graphics Expression of Left Arrow | Text Data of "Turn Left" | Red | XX Dots |
| To The Left | | | | |
| Left | | | | |
| ⋮ | ⋮ | ⋮ | ⋮ | ⋮ |

FIG.10

| Guide Expression | Presentation Timing |
|---|---|
| Immediately | 1 Second Later |
| A Little Later | 10 Seconds Later |
| ⋮ | ⋮ |

FIG.22

| Cancellation/Correction Expression |
|---|
| Wrong |
| Made a Mistake |
| Made an Error |
| Not ... But |
| Undo |
| ⋮ |

NAVIGATION APPARATUS, METHOD AND PROGRAM

TECHNICAL FIELD

The present invention relates to a navigation apparatus, method and program capable of recognizing a user speech content and capable of navigating.

BACKGROUND ART

Generally, a navigation apparatus in a car or the like guides a driver by means of voice output and graphic display when a prescribed point (such as an intersection where the direction of travel is to be changed) approaches during driving on the route set.

However, although the navigation apparatus can guide at a prescribed point preset, it cannot present a driver with a guide content a fellow passenger gives to the driver during driving as a guide content of the navigation apparatus.

Consequently, if the driver misunderstands the guidance of a fellow passenger or misses it because of surrounding noise, this offers a problem in that the driver cannot drive in conformity with the guidance of the fellow passenger.

Considering such a problem, Patent Document 1, for example, describes a voice recognition apparatus that always recognizes voice and displays the recognition result in text on the screen without change.

PRIOR ART DOCUMENT

Patent Document

Patent Document 1: Japanese Patent Laid-Open No. 2010-204637.

DISCLOSURE OF THE INVENTION

Problems to be Solved by the Invention

Such a conventional navigation apparatus as described above, however, only displays the voice recognition result in text on the screen, and does not have a function of extracting a guide expression from the recognition result and of displaying it. Accordingly, it is likely that a content unrelated with the guidance can be displayed, and that it has a problem of making it difficult for the driver to understand the content intuitively because the speech content is displayed in text as it is.

The present invention is implemented to solve the foregoing problem. Therefore it is an object of the present invention to provide a navigation apparatus, method and program capable of extracting only a guide expression a fellow passenger talks to the driver and of presenting the user with it in a manner that the user can understand the content easily and intuitively.

Means for Solving the Problem

To accomplish the foregoing object, the present invention comprises, in a navigation apparatus which includes a position acquiring unit that acquires the position of a mobile body, and which carries out guidance in accordance with map data and the position of the mobile body acquired by the position acquiring unit, a voice acquiring unit that acquires input voice; a voice recognition unit that executes voice recognition processing of voice data acquired by the voice acquiring unit; a guide expression storage unit that stores a guide expression; a guide expression extracting unit that refers to the guide expression storage unit and extracts a guide expression from a recognition result of the voice recognition unit; a guide expression presentation content storage unit that stores a presentation content which corresponds to the guide expression in connection with the guide expression; a guide expression presentation content acquiring unit that refers to the guide expression presentation content storage unit, and acquires, in accordance with the guide expression extracted by the guide expression extracting unit, the presentation content corresponding to the guide expression; and a presentation control output unit that outputs the presentation content acquired by the guide expression presentation content acquiring unit.

Advantages of the Invention

According to the navigation apparatus in accordance with the present invention, it is configured in such a manner that it extracts only the guide expression the talker such as a fellow passenger speaks to the driver and outputs the presentation content which corresponds to the guide expression. Accordingly, the driver can understand the content intuitively, which can prevent the driver from misunderstanding, and from driving toward a direction the talker does not intend.

BRIEF DESCRIPTION OF THE DRAWINGS

FIG. 2 is a diagram showing an example of a guide expression storage unit 3;

FIG. 3 is a diagram showing an example of a guide expression presentation content storage unit 5 when a presentation content is a visual presentation content;

FIG. 10 is a diagram showing an example of a presentation timing storage unit 12;

FIG. 22 is a diagram showing an example of a cancellation/correction expression storage unit 16;

BEST MODE FOR CARRYING OUT THE INVENTION

The best mode for carrying out the invention will now be described with reference to the accompanying drawings.

Embodiment 1

In a navigation apparatus that guides in accordance map data and the position of a vehicle (mobile body), the present invention extracts only a guide expression a fellow passenger gives to a driver and presents its content to the driver in a manner that the driver can understand intuitively.

Figure 1:
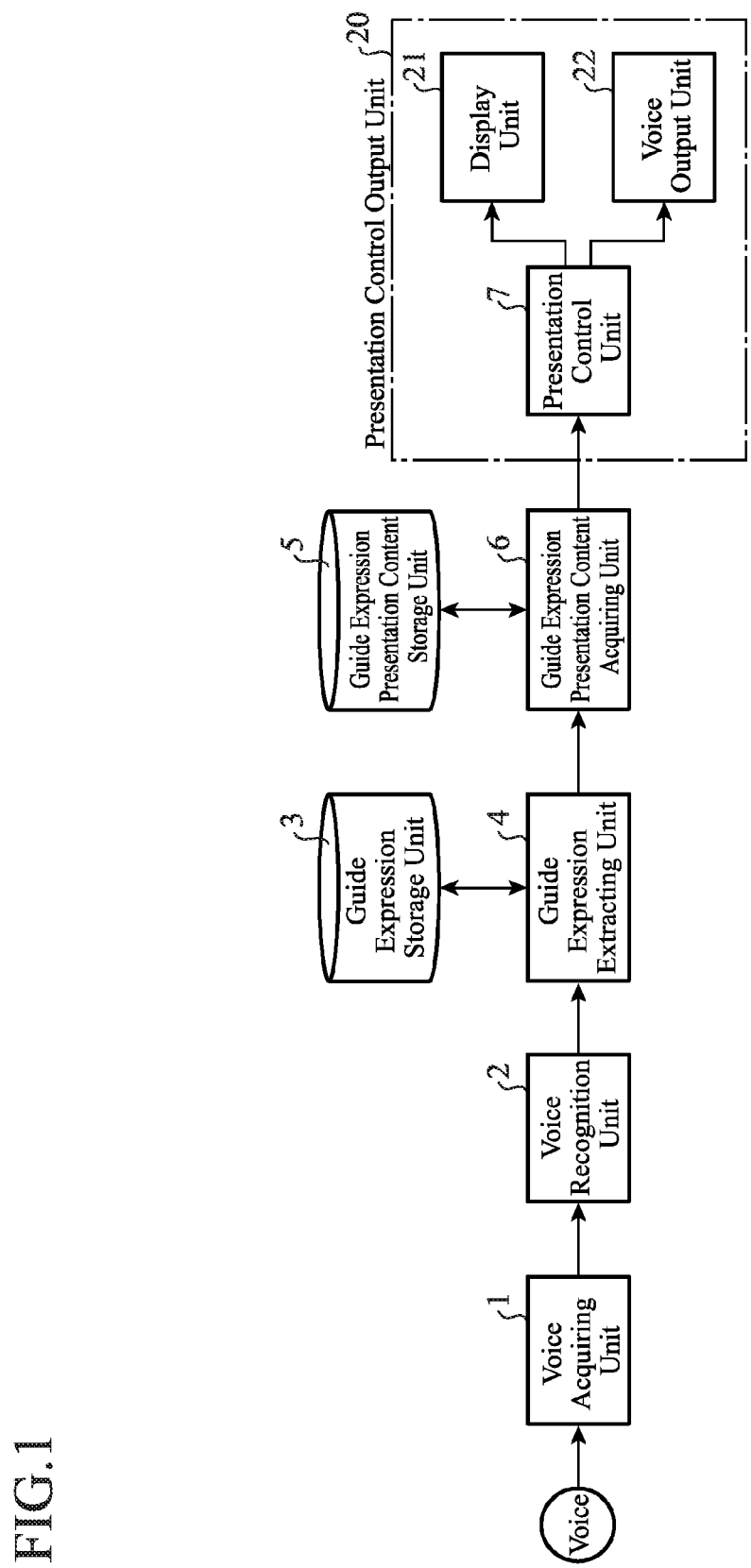
FIG. 1 is a block diagram showing an example of a navigation apparatus of an embodiment 1.

FIG. 1 is a block diagram showing an example of a navigation apparatus of an embodiment 1 in accordance with the present invention. The navigation apparatus comprises a voice acquiring unit 1, a voice recognition unit 2, a guide expression storage unit 3, a guide expression extracting unit 4, a guide expression presentation content storage unit 5, a guide expression presentation content acquiring unit 6, a presentation control unit 7, a display unit 21, and a voice output unit 22. Incidentally, the presentation control unit 7, the display unit 21 and the voice output unit 22 constitute a presentation control output unit 20. In addition, although not shown in FIG. 1, the navigation apparatus comprises a key input unit that acquires an input signal from a keyboard or touch screen. In addition, it can comprise a map data storage unit 8 that stores map data such as road data, intersection data and facility data or comprise a map data acquiring unit that can acquire the map data from the outside via a network. As for the map data storage unit 8 (or map data acquiring unit), they are not shown in FIG. 1. In addition, although not shown also, it comprises a vehicle position acquiring unit (position acquiring unit) 9 for acquiring the position of the vehicle (mobile body). The vehicle position acquiring unit (position acquiring unit) 9 is a device that acquires the present position (longitude and latitude) of the vehicle (mobile body) using the information acquired from a GPS receiver or gyroscope.

The voice acquiring unit 1 acquires user speech picked up with a microphone, that is, the input voice in PCM (Pulse Code Modulation), for example, after passing it through A/D conversion.

The voice recognition unit 2 has a recognition dictionary (not shown), detects a voice section corresponding to a content a talker such as a fellow passenger utters from the voice data acquired by the voice acquiring unit 1, extracts features and executes voice recognition processing in accordance with the features using the recognition dictionary. Incidentally, the voice recognition unit 2 can use a voice recognition server on the network.

The guide expression storage unit 3 stores expressions assumed to be generally used during guidance.

FIG. 2 is a diagram showing an example of the guide expression storage unit 3. As shown in FIG. 2, the guide expression storage unit 3 stores expressions which indicate timing of guiding such as "immediately" and "a little later", which indicate places such as "200 meters ahead" and "the next intersection", and which indicate direction "turn right" and "to the west".

The guide expression extracting unit 4, referring to the guide expression storage unit 3, executes morphological analysis and extracts a guide expression from a character string of a voice recognition result of the voice recognition unit 2.

The guide expression presentation content storage unit 5 stores a guide expression extracted by the guide expression extracting unit 4 in connection with the presentation content which corresponds to the guide expression (visual presentation content or auditory presentation content). When the presentation content which corresponds to the guide expression is a visual presentation content, the presentation content is a content that is visually presented to the driver via a display screen or dashboard for the navigation. For example, it presents graphics such as an arrow or an indicator of a direction, characters indicating a direction, and a road to be taken on a map by changing colors or thickness of the road to emphasize it.

FIG. 3 is a diagram showing an example of the guide expression presentation content storage unit 5 when the presentation content is a visual presentation content. As shown in FIG. 3, as for the guide expression such as "turn right", "to the right" and "on the right", it stores graphics data such as a right arrow, a text expression (character string data) such as "turn right" and "right" and information about a color and thickness of a right turn road on a map. Incidentally, although the color and thickness of the road are set equal for a right turn and left turn in FIG. 3, they can take different colors and thickness for each guide expression.

In addition, as for the guide expression presentation content storage unit 5 when the presentation content is an auditory presentation content, although it is not shown, it stores voice data (synthesized voice) which are assumed to correspond to the guide expressions as shown in FIG. 2, stores voice data (synthesized voice) "turn right" for the guide expressions "turn right", "to the right" and "on the right", and stores voice data (synthesized voice) "turn left" for the guide expressions "turn left" "to the left" and "on the left".

The guide expression presentation content acquiring unit 6 searches the guide expression presentation content storage unit 5 using the guide expression extracted by the guide expression extracting unit 4 as a search key, and retrieves the presentation content which corresponds to the guide expression (visual presentation content or auditory presentation content) which agrees with the search key.

Incidentally, when the presentation content is an auditory presentation content, although the present embodiment creates the synthesized voice in advance and stores it in the guide expression presentation content storage unit 5, a configuration is also possible in which the guide expression presentation content acquiring unit 6 creates the synthesized voice in accordance with the voice data stored in the guide expression presentation content storage unit 5, thereby obtaining the presentation content.

The presentation control unit 7 supplies the presentation content, which is acquired by the guide expression presentation content acquiring unit 6, to the display unit 21 or to the voice output unit 22 (or to both of them). More specifically, when the presentation content is a visual presentation content, it supplies it to the display unit 21 (onto the display screen for the navigation, onto the dashboard, or onto the windshield, for example), and when the presentation content is an auditory presentation content, it supplies it to the voice output unit 22 (such as a speaker).

Figure 4:
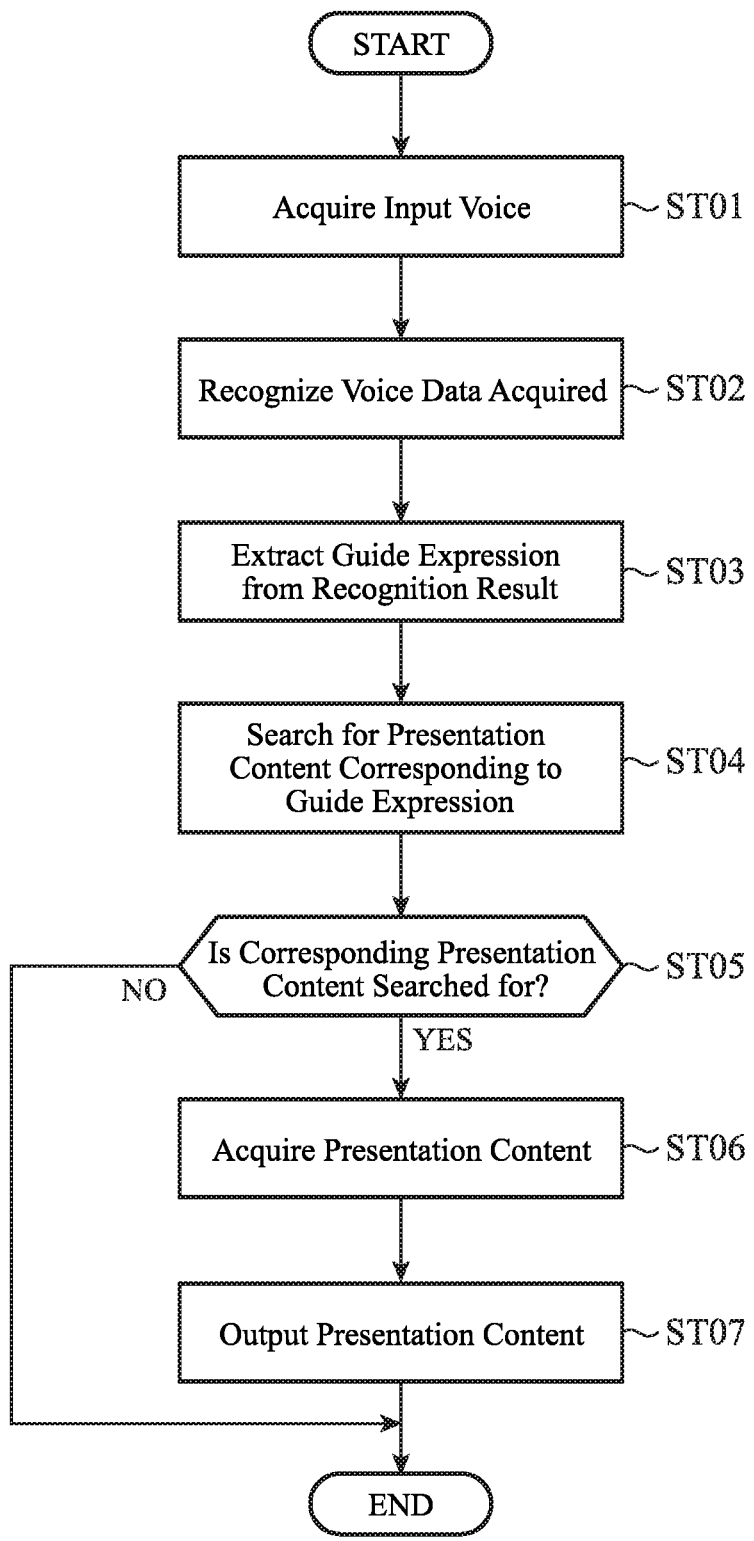
FIG. 4 is a flowchart showing the operation of the navigation apparatus of the embodiment 1.

Next, the operation of the navigation apparatus of the embodiment 1 with the foregoing configuration will be described. FIG. 4 is a flowchart showing the operation of the navigation apparatus of the embodiment 1.

First, if some kind of speech input occurs, the voice acquiring unit 1 acquires the input voice, carries out the A/D conversion, and obtains as the PCM voice data, for example (step ST01). Next, the voice recognition unit 2 recognizes the voice data obtained by the voice acquiring unit 1 (step ST02). Then the guide expression extracting unit 4, referring to the guide expression storage unit 3, extracts a guide expression from the recognition result of the voice recognition unit 2 (step ST03). After that, using the guide expression extracted by the guide expression extracting unit 4 as a search key, the guide expression presentation content acquiring unit 6 searches the guide expression presentation content storage unit 5 for the guide expression that matches the search key, thereby searches for the presentation content which corresponds to the guide expression (visual presentation content or auditory presentation content) (step ST04).

Then, if the guide expression that matches the search key is found (YES at step ST05), it acquires the presentation content which corresponds to the guide expression (visual presentation content or auditory presentation content or both of them) (step ST06), and the presentation control output unit 20 outputs the presentation content (by display or voice or both of them) (step ST07). On the other hand, unless the guide expression that matches the search key is found (NO at step ST05), the processing is terminated.

The processing will be described using a concrete example. For example, when the fellow passenger says "turn right 200 meters ahead", the voice acquiring unit 1 acquires the voice data (step ST01), and the voice recognition unit 2 obtains the recognition result "turn right 200 meters ahead" (step ST02). Then, referring to the guide expression storage unit 3 as shown in FIG. 2, the guide expression extracting unit 4 extracts character strings "right" and "200 meters ahead" as the guide expression (step ST03). After that, using the character string "right" and the character string "200 meters ahead" as a search key, the guide expression presentation content acquiring unit 6 searches the guide expression presentation content storage unit 5 as shown in FIG. 3 for the guide expression that matches the search key (step ST04). As to the example, although the guide expression that matches the search key "200 meters ahead" is not found, the guide expression that matches the search key "right" is found (YES at step ST05). Thus, it acquires "graphics data of right arrow" or "character string data of "turn right"", which is a visual presentation content corresponding to the guide expression "right", and/or "voice data "turn right"" which is an auditory presentation content (step ST06). Then, if the acquired presentation content is the visual presentation content, it outputs it on the display screen, and if the presentation content is the auditory presentation content, it outputs it from the speaker (step ST07). Incidentally, if both the presentation contents are acquired, both the display and voice output are performed.

Figure 5:
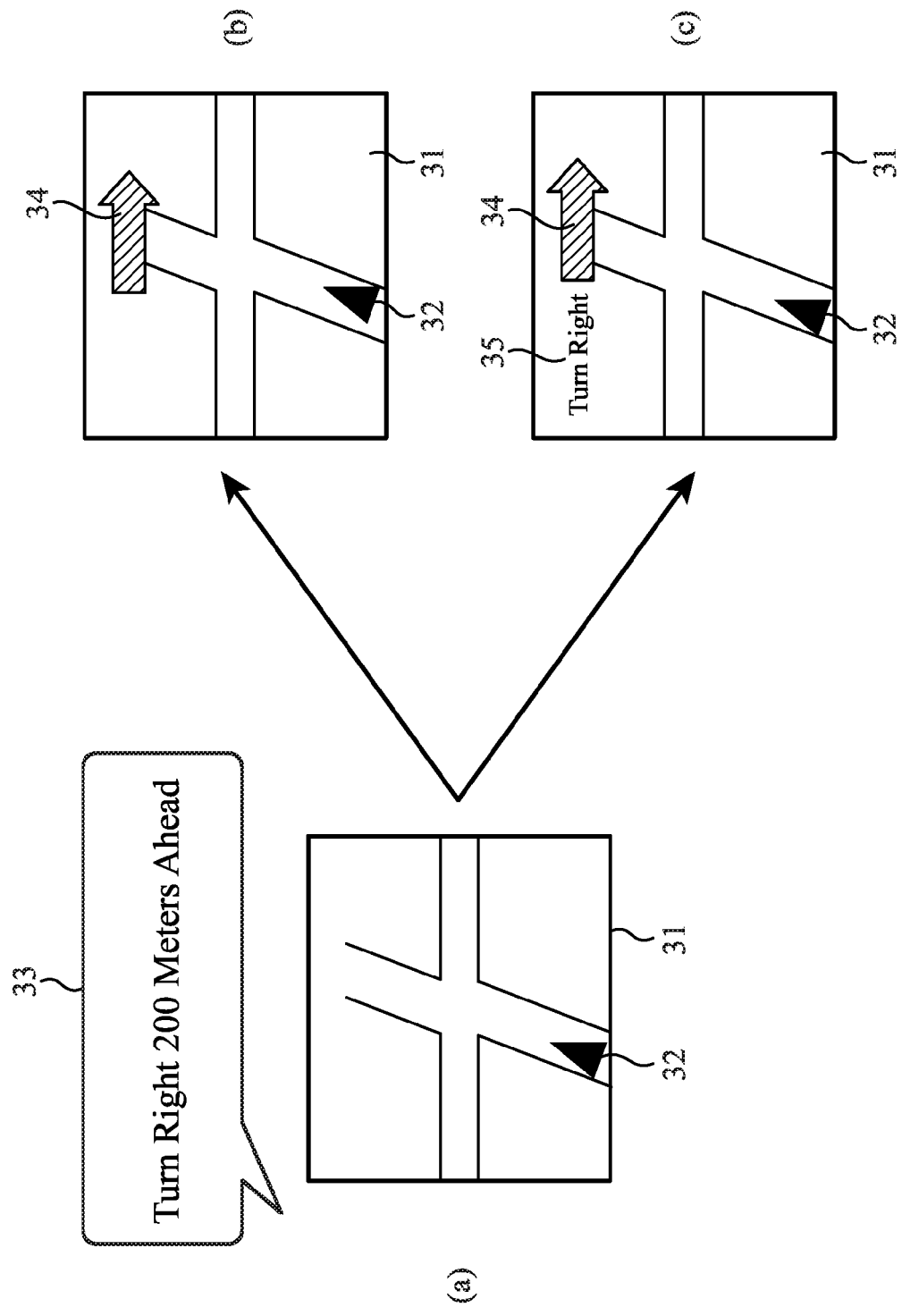
FIG. 5 is a diagram showing a screen example of guide information presented to a user when the presentation content is a visual presentation content in the embodiment 1.

FIG. 5 is a diagram showing a screen example of a presentation content which is output onto the display screen and is provided to a user when the presentation content is a visual presentation content. FIG. 5(*a*) shows a display screen on which the vehicle 32 is displayed on a navigation screen 31 by a triangle, and shows a state in which a fellow passenger utters "turn right 200 meters ahead", and the speech content is shown in a balloon 33. Then, FIG. 5(*b*) shows a state in which the "graphics data of right arrow" 34 is displayed on the same navigation screen 31 as that of FIG. 5(*a*) as a visual presentation content as a result of the operation which is shown in the foregoing flowchart and is performed by the navigation apparatus. In addition, FIG. 5(*c*) shows a state in which "text data of "turn right"" 35 is displayed in addition to the "graphics data of right arrow" 34.

Incidentally, when the presentation content is a visual presentation content, it can be displayed only as the graphics information as shown in FIG. 5(*b*), or displayed as both the text information and graphics information as shown in FIG. 5(*c*). In addition, a configuration is also possible which enables a user to decide which display is to be employed.

In addition, as for the display place, it can be anywhere on the screen, some fixed display place or a place where a road will not be concealed. In addition, it is not necessary to be placed on the display screen of the navigation apparatus, but can be on the windshield. Furthermore, if there are more than one output devices such as the display screen and windshield, a configuration is also possible which further comprises a presentation device identifying unit and determines which of the output devices is to be used for the presentation.

In addition, a configuration is also possible which turns the displayed graphics or text on and off, displays them in such a manner that they move from right to left or fade in, thereby making it easier for the user to recognize the display. In addition, a configuration is possible which enables the user to select the method of display.

In addition, as for the output presentation content, a configuration is also possible which enables the user to determine whether to display only the visual presentation content, to output only the auditory presentation content in voice, or to output both of them.

Incidentally, as for the auditory presentation content when both the visual presentation content and the auditory presentation content are output as the presentation contents, it can be a nonverbal sound such as /pawn/ that will call attention (a sound effect for calling attention) rather than the voice data corresponding to the guide expression. In addition, when only the visual presentation content is output, a configuration is also possible which outputs the auditory presentation content of such a nonverbal sound in combination with the visual presentation content.

Incidentally, although it is assumed that the present embodiment always carries out recognition of the speech content of the fellow passenger, a configuration is also possible which carries out the voice recognition only during a prescribed period (for example, during the period from the time when the fellow passenger starts guidance and pushes down a button for executing the voice recognition to the time when the button is released). In addition, a configuration is also possible which enables the user to decide whether to carry out the recognition always or for a prescribed period.

As described above, according to the present embodiment 1, it extracts only the guide expression the talker such as a fellow passenger utters, and can visually display the guide expression in the graphics data like an arrow or in the text data. Accordingly, it can facilitate the driver's intuitive understanding, prevent the misunderstanding of the driver and prevent the vehicle from going in the direction the talker does not intend. In addition, when the presentation content to the driver is not a visual presentation content but an auditory presentation content, the present embodiment 1 outputs the guide expression, which the talker such as a fellow passenger utters, in voice again. Accordingly, it can prevent the misunderstanding of the driver, and prevent the vehicle from going in the direction the talker does not intend. Furthermore, it can output both the visual presentation content and auditory presentation content, thereby being able to further prevent the misunderstanding of the driver and to prevent the vehicle from going toward a direction the talker does not intend.

Embodiment 2

Figure 6:
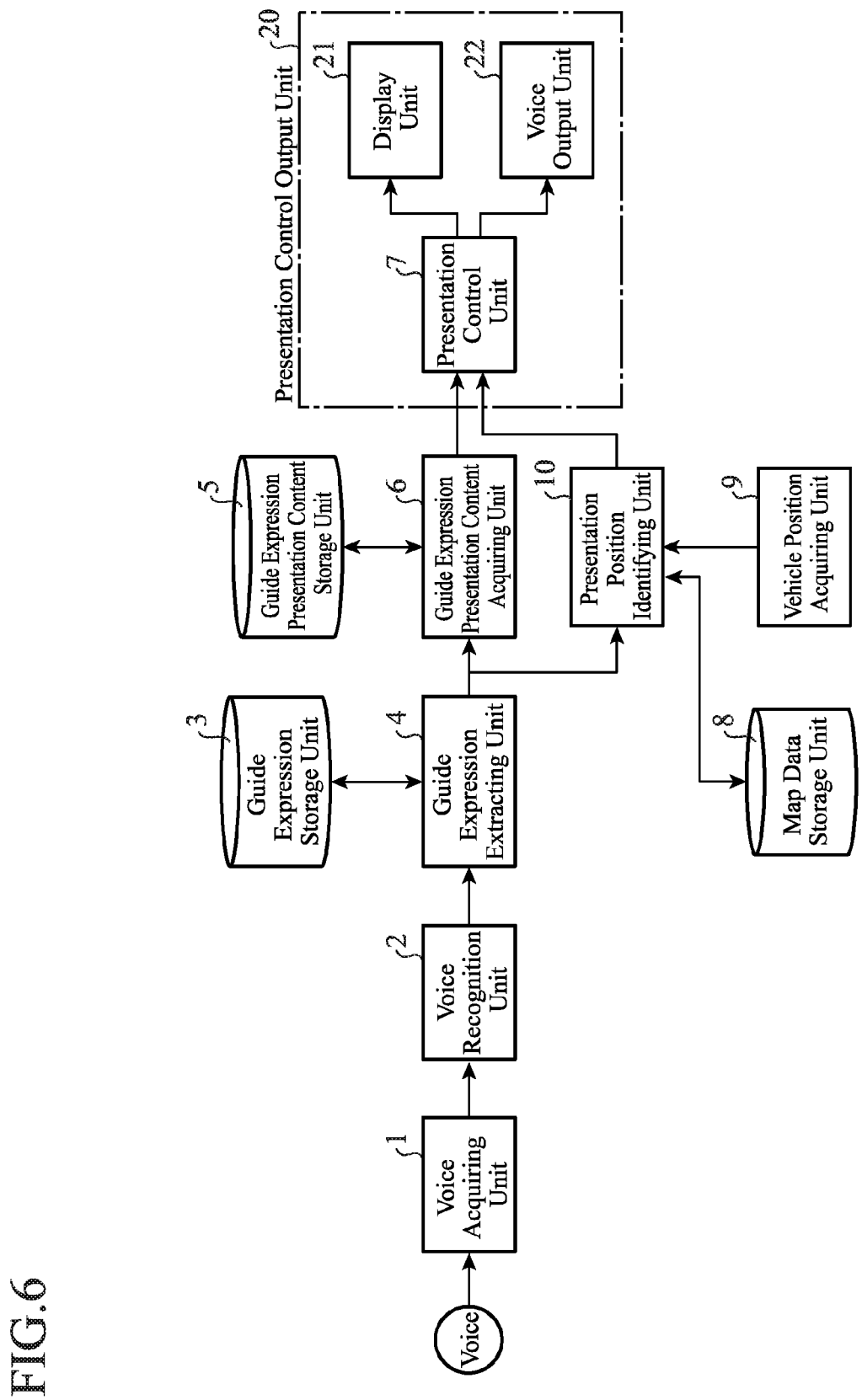
FIG. 6 is a block diagram showing an example of a navigation apparatus of an embodiment 2.

FIG. 6 is a block diagram showing an example of a navigation apparatus of an embodiment 2 in accordance with the present invention. Incidentally, the same components as those described in the embodiment 1 are designated by the same reference numerals and their duplicate description will be omitted. As compared with the embodiment 1, the embodiment 2 described below comprises a presentation position identifying unit 10. It identifies the position where the presentation content is to be displayed when the presentation content is a visual presentation content, and outputs the position.

In addition, FIG. 6 of the present embodiment 2 shows the map data storage unit 8 and the vehicle position acquiring unit (position acquiring unit) 9 not shown in FIG. 1 which is the block diagram of the embodiment 1.

The map data storage unit 8 stores map data such as road data, intersection data and facility data in a medium such as a DVD-ROM, a hard disk or an SD card. Incidentally, instead of the map data storage unit 8, a map data acquiring unit can be used which is placed on a network and acquires map data information such as road data via a communication network.

The vehicle position acquiring unit (position acquiring unit) 9 acquires the present position (longitude and latitude) of the vehicle (mobile body) using information acquired from a GPS receiver or gyroscope.

The presentation position identifying unit 10 identifies, when the presentation content is a visual presentation content, the position where the visual presentation content is to be displayed by using the position of the vehicle (mobile body) acquired by the vehicle position acquiring unit (position acquiring unit) 9, the guide expression extracted by the guide expression extracting unit 4, and the map data stored in the map data storage unit 8.

Figure 7:
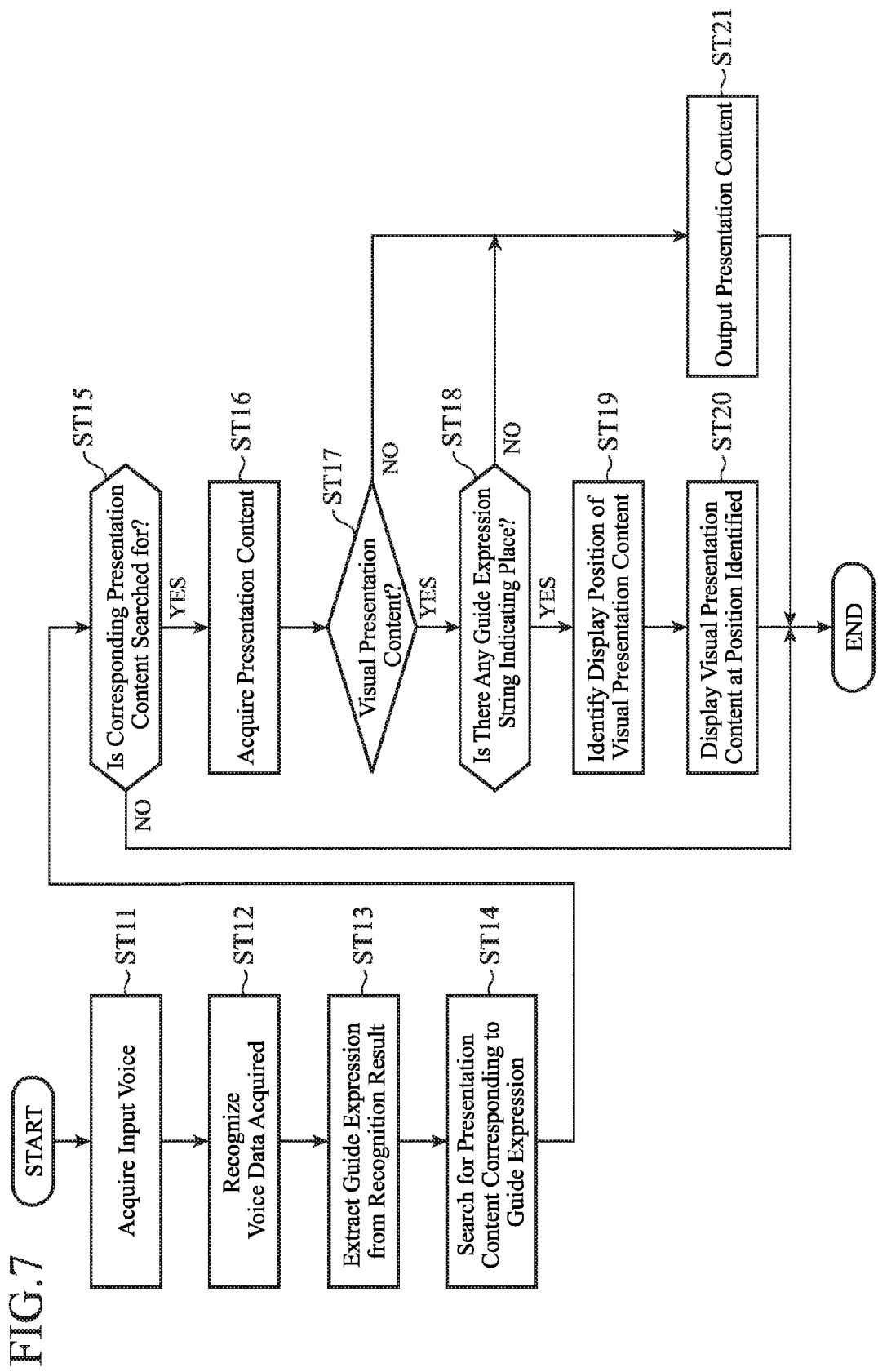
FIG. 7 is a flowchart showing the operation of the navigation apparatus of the embodiment 2.

Next, the operation of the navigation apparatus of the embodiment 2 with the configuration as described above will be described. FIG. 7 is a flowchart showing the operation of the navigation apparatus of the embodiment 2.

As for the processing from step ST11 to ST16, since it is the same as the processing from step ST01 to ST06 in the flowchart of FIG. 4 in the embodiment 1, its description will be omitted. Then, the present embodiment 2 decides on whether the presentation content acquired at step ST16 is a visual presentation content or not (step ST17). On this occasion, if the presentation content is a visual presentation content (YES at step ST17), the present embodiment 2 decides on whether the guide expression extracted by the guide expression extracting unit 4 contains the guide expression indicating a place (step ST18). Then, if it contains the guide expression indicating a place such as "200 meters ahead" (YES at step ST18), the presentation position identifying unit 10 identifies the position where the visual presentation content is to be displayed by using the vehicle position (the position of the mobile body) acquired from the vehicle position acquiring unit (position acquiring unit) 9, the guide expression extracted by the guide expression extracting unit 4, and the map data stored in the map data storage unit 8 (step ST19), and the presentation control output unit 20 displays the visual presentation content at the position identified (step ST20).

On the other hand, if the presentation content is not a visual presentation content, but an auditory presentation content at step ST17 (NO at step ST17), or if the guide expression indicating a place is not contained at step ST18, the presentation content is output as voice output when the presentation content is an auditory presentation content, or is output at a predetermined position on the screen when the presentation content is a visual presentation content and the guide expression indicating a place is not contained (step ST21).

The processing will be described using a concrete example. For example, when the fellow passenger says "turn right 200 meters ahead", the voice acquiring unit 1 acquires the voice data (step ST11), and the voice recognition unit 2 obtains the recognition result "turn right 200 meters ahead" (step ST12). Then, referring to the guide expression storage unit 3 as shown in FIG. 2, the guide expression extracting unit 4 extracts character strings "right" and "200 meters ahead" as the guide expression (step ST13). After that, using the character string "right" and the character string "200 meters ahead" as a search key, the guide expression presentation content acquiring unit 6 searches the guide expression presentation content storage unit 5 as shown in FIG. 3 for the guide expression that matches the search key (step ST14). On this occasion, although the guide expression that matches the search key "200 meters ahead" is not found, the guide expression that matches the search key "right" is found (YES at step ST15). Thus, it acquires "graphics data of right arrow" or "character string data of "turn right"", which is a visual presentation content corresponding to the guide expression "right", information such as "make the color of the road red" or "make the thickness of the road XX dots" or "voice data "turn right"" which is an auditory presentation content (step ST16). As for the presentation contents that are to be acquired, they can be all the presentation contents stored in the guide expression presentation content storage unit 5 in connection with the guide expression, or only the preset presentation contents when the presentation contents have been set in advance.

Then, when the presentation content acquired is a visual presentation content (YES at step ST17), a decision is made on whether the guide expression contains the guide expression indicating a place or not (step ST18). In the present example, since it contains the guide expression indicating a place "200 meters ahead" (YES at step ST18), the presentation position identifying unit 10 calculates the position 200 meters ahead from the vehicle position acquired from the vehicle position acquiring unit (position acquiring unit) 9, identifies the intersection where the vehicle will turn right by referring to the map data storage unit 8, and identifies the road to be passed through after the right turn at the intersection (step ST19). Then finally, the visual presentation content acquired by the guide expression presentation content acquiring unit 6 is displayed at the position identified by the presentation position identifying unit 10 (step ST20). In this case, since the road (position) where the presentation content is to be displayed is identified at step ST19, it is possible not only to display the "graphics data of right arrow" or "character string data of "turn right"" on the identified road, but also to display the identified road by making it red in color and thicker using the information such as "make the color of the road red" and "make the thickness of the road XX dots" acquired by the guide expression presentation content acquiring unit 6.

Figure 8:
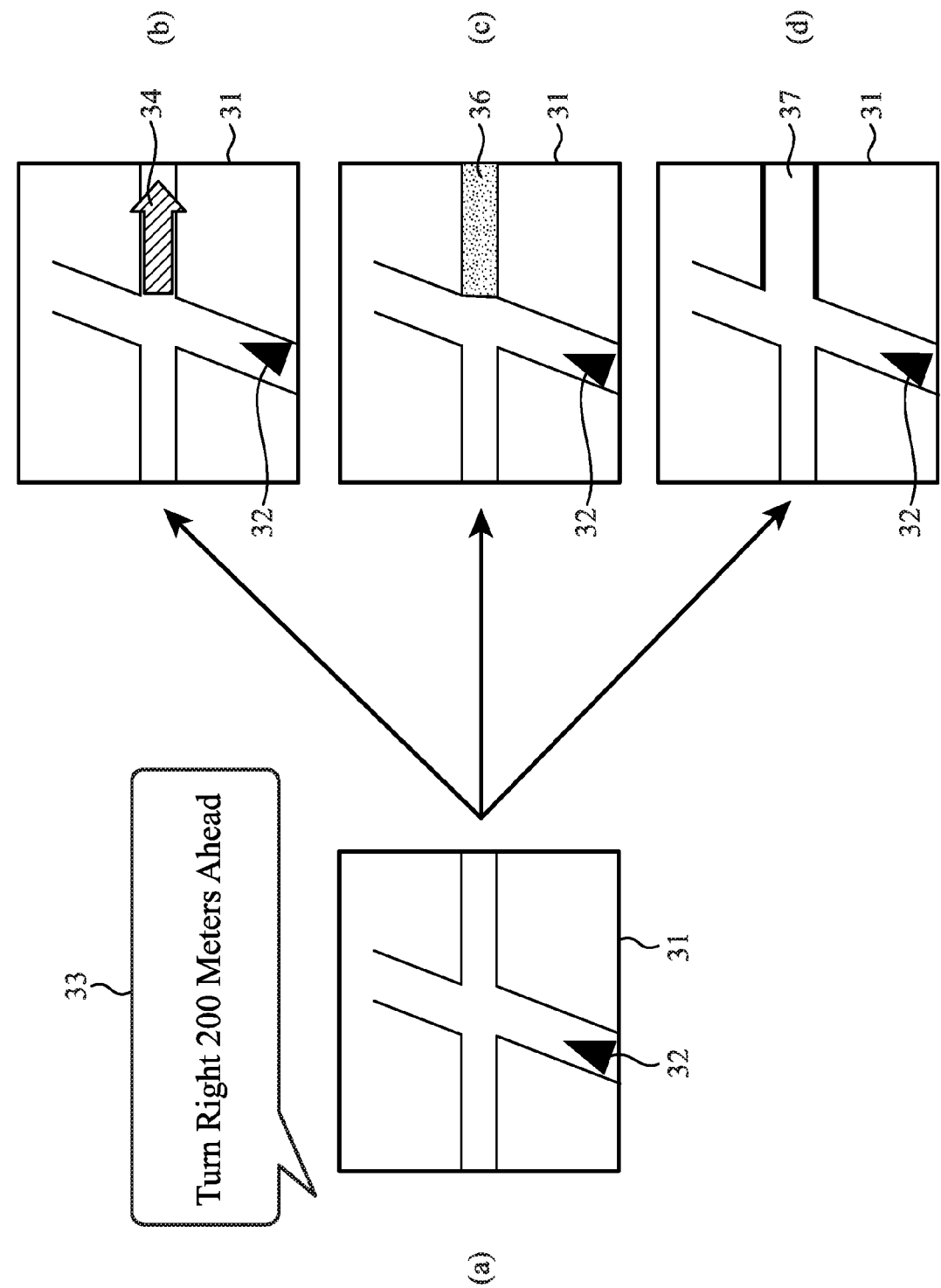
FIG. 8 is a diagram showing a screen example of guide information presented to a user when the presentation content is a visual presentation content in the embodiment 2.

FIG. 8 is a diagram showing a screen example of providing, when the presentation content is a visual presentation content and when the guide expression contains the guide expression indicating a place, the presentation content to the user by outputting it onto the display screen. FIG. 8(*a*) is the same as FIG. 5(*a*) which shows the display screen on which the vehicle 32 is displayed on the navigation screen 31 by a triangle, and shows a state in which a fellow passenger utters "turn right 200 meters ahead", and the speech content is shown in the balloon 33. Then, FIG. 8(*b*) shows a state in which the "graphics data of right arrow" 34 is displayed as a visual presentation content on the road the vehicle will pass through after the right turn as a result of the operation shown in the flowchart in the foregoing FIG. 7, which is performed by the navigation apparatus on this occasion. In addition, FIG. 8(*c*) shows a state in which the color of the road is made red (red road 36), and FIG. 8(*d*) shows a state in which the thickness of the road is increased (wide road 37).

On this occasion, it is also possible to display the text information "turn right" as shown in FIG. 5(*c*). In this case, the text information can be displayed on the identified road or on the intersection where the right turn is to be made. In addition, a configuration is also possible which enables the user to determine which one of the text information and graphics information is to be displayed or both of them are to be displayed.

In addition, they can be displayed on the windshield rather than on the display screen of the navigation apparatus. Furthermore, if there are more than one output devices such as the display screen and windshield, a configuration is also possible which further comprises a presentation device identifying unit and determines which of the output devices is to be used for the presentation.

In addition, a configuration is also possible which turns the displayed graphics or text on and off, displays them in such a manner that they move from the position of the intersection to the right or fade in, thereby making it easier for the user to recognize the display. In addition, a configuration is possible which enables the user to decide the method of display.

On the other hand, when the presentation content acquired is a visual presentation content (YES at step ST17), and the guide expression does not contain the guide expression indicating a place (NO at step ST18), the present embodiment 2 displays (outputs) the visual presentation content at the predetermined position on the display screen in the same manner as the embodiment 1. In addition, when the presentation content is an auditory presentation content, it outputs it from the speaker (step ST21).

Incidentally, although it is assumed in the present embodiment that it always carries out recognition of the speech content of the fellow passenger, a configuration is also possible which carries out the voice recognition only during a prescribed period (for example, during the period from the time when the fellow passenger starts guidance and pushes down a button for executing the voice recognition to the time when the button is released). In addition, a configuration is also possible which enables the user to determine whether to carry out the recognition always or for a prescribed period.

In addition, a configuration is also possible which enables the user to determine whether to use the identifying function of the presentation position in the present embodiment 2 or not.

As described above, according to the present embodiment 2, it extracts only the guide expression the talker such as a fellow passenger utters, and visually displays the guide expression in the graphics data like an arrow or in the text data at the guide position the talker intends. Accordingly, in addition to the advantages of the embodiment 1, it can prevent the driver from changing the course at a wrong position.

Embodiment 3

Figure 9:
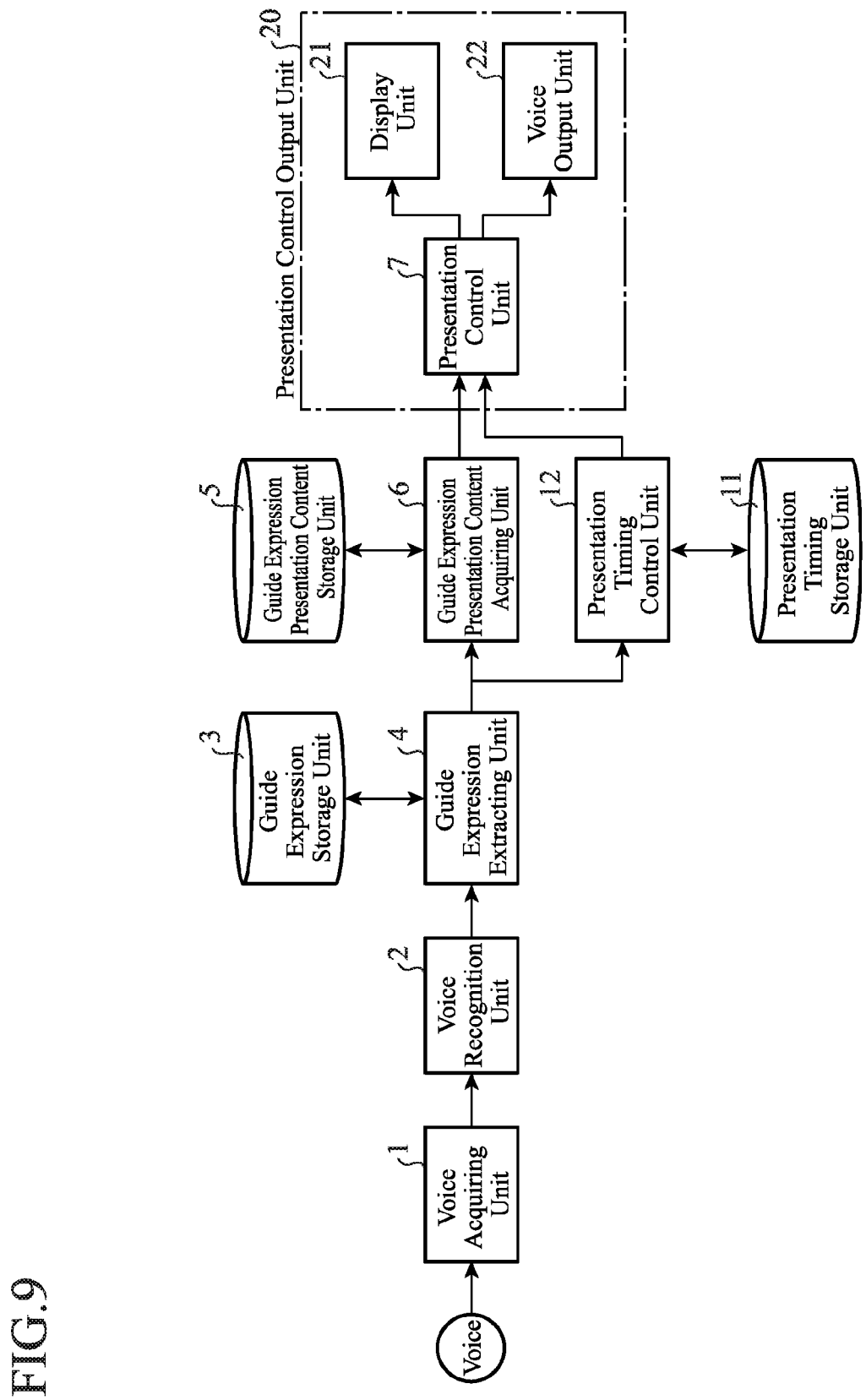
FIG. 9 is a block diagram showing an example of a navigation apparatus of an embodiment 3.

FIG. 9 is a block diagram showing an example of a navigation apparatus of an embodiment 3 in accordance with the present invention. Incidentally, the same components as those described in the embodiment 1 or 2 are designated by the same reference numerals and their duplicate description will be omitted. As compared with the embodiment 1, the embodiment 3 described below comprises a presentation timing storage unit 11 and a presentation timing control unit 12. Then, it outputs a presentation content to a driver by changing a timing of the presentation in response to the speech content of a talker such as a fellow passenger.

The presentation timing storage unit 11 stores the timing of the presentation in connection with a guide expression.

The presentation timing control unit 12, referring to the presentation timing storage unit 11 in accordance with the guide expression extracted by the guide expression extracting unit 4, determines, when the extracted guide expression contains an expression indicating the timing of the presentation of the presentation content, the presentation timing corresponding to the expression.

FIG. 10 is a diagram showing an example of the presentation timing storage unit 11. As shown in FIG. 10, in connection with guide expressions, the presentation timing storage unit 11 stores presentation timings such as "in one second" for the expression indicating the timing of the presentation of a guide expression "immediately", and a presentation timing "in 10 seconds" for the expression "a little later".

Figure 11:
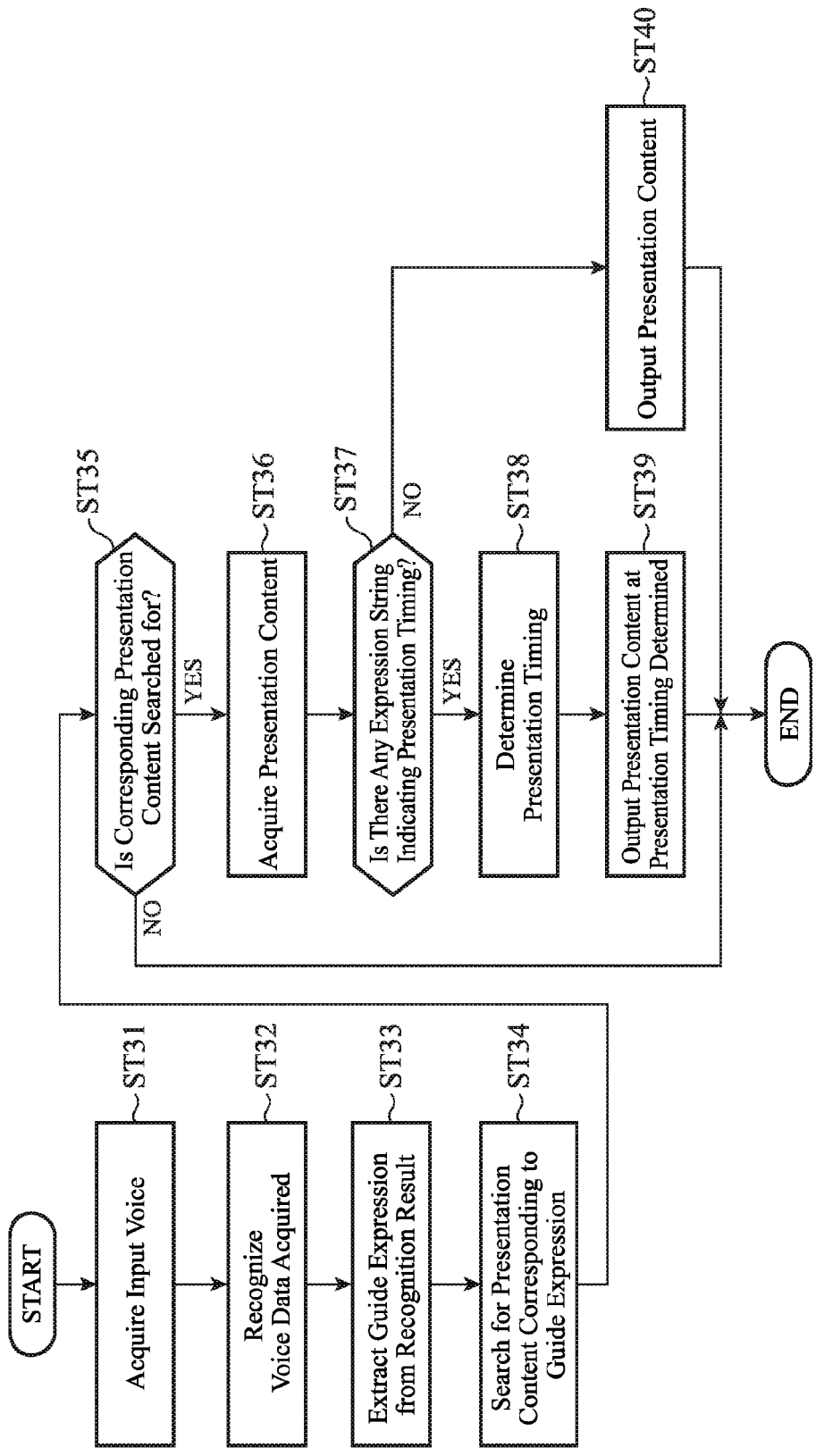
FIG. 11 is a flowchart showing the operation of the navigation apparatus of the embodiment 3.

Next, the operation of the navigation apparatus of the embodiment 3 with the configuration as described above will be described. FIG. 11 is a flowchart showing the operation of the navigation apparatus of the embodiment 3.

As for the processing from step ST31 to ST36, since it is the same as the processing from step ST01 to ST06 in the flowchart of FIG. 4 in the embodiment 1, its description will be omitted. Then, the present embodiment 3 decides on whether the guide expression extracted by the guide expression extracting unit 4 at step ST33 contains a character string indicating the timing of the presentation of the expression (step ST37). If the expression indicating the presentation timing is contained (YES at step ST37), the presentation timing control unit 12, referring to the presentation timing storage unit 11 as shown in FIG. 10, determines the presentation timing corresponding to the expression indicating the presentation timing (step ST38). Then, the presentation control output unit 20 outputs the presentation content at the presentation timing determined at step ST38 (step ST39).

On the other hand, if no expression indicating the presentation timing is contained at step ST37 (NO at step ST37), it outputs the presentation content instantly or at a predetermined timing (step ST40).

The processing will be described using a concrete example. For example, when the fellow passenger says "turn right a little later", the voice acquiring unit 1 acquires the voice data (step ST31), and the voice recognition unit 2 obtains the recognition result "turn right a little later" (step ST32). Then, referring to the guide expression storage unit 3 as shown in FIG. 2, the guide expression extracting unit 4 extracts character strings "turn right" and "a little later" as the guide expression (step ST33). After that, using the character string "turn right" and the character string "a little later" as a search key, the guide expression presentation content acquiring unit 6 searches the guide expression presentation content storage unit 5 as shown in FIG. 3 for the guide expression that matches the search key (step ST34). On this occasion, although the guide expression that matches the search key "a little later" is not found, the guide expression that matches the search key "turn right" is found (YES at step ST35). Thus, it acquires "graphics data of right arrow" or "character string data of 'turn right'", which is a visual presentation content corresponding to the guide expression "turn right", information such as "make the color of the road red" or "make the thickness of the road XX dots" or "voice data 'turn right'" which is an auditory presentation content (step ST36). As for the presentation contents that are to be acquired, they can be all the presentation contents stored in the guide expression presentation content storage unit 5 in connection with the guide expression, or only the preset presentation contents when the presentation contents have been set in advance.

After that, a decision is made on whether the guide expressions "turn right" and "a little later" extracted at step ST33 contain a guide expression indicating the presentation timing or not (step ST37). As for the example, since it contains the guide expression indicating the presentation timing "a little later" (YES at step ST37), the presentation timing control unit 12, referring to the presentation timing storage unit 11 as shown in FIG. 10, determines the timing "in 10 seconds" corresponding to the presentation timing "a little later" (step ST38). Finally, when the presentation content acquired by the guide expression presentation content acquiring unit 6 at step ST36 is a visual presentation content, the presentation control unit 7 outputs and displays on the display screen or the like at the presentation timing determined at step ST38. In contrast, when the presentation content is an auditory presentation content, it outputs its voice from the speaker at the presentation timing determined at step ST38 (step ST39).

Here, the presentation timing control unit 12 can comprise a learning function of the presentation timing corresponding to the guide expression indicating the presentation timing. More specifically, in such cases where the vehicle has already passed through a guide point when the presentation content is displayed on the screen or output from the speaker at the presentation timing determined by the presentation timing control unit 12, the content stored in the presentation timing storage unit 11 shown in FIG. 10 is altered in such a manner that the time from the acquisition of the presentation content by the guide expression presentation content acquiring unit 6 to the actual passing through the guide point is assigned as the presentation timing for the same expression next time.

For example, when the guide expression indicating the presentation timing is "a little later", the presentation content is provided "in 10 seconds" as described above. However, if the actual time taken for the vehicle to pass through the guide point is five seconds, the presentation timing corresponding to the guide expression "a little later" in the presentation timing storage unit 11 shown in FIG. 10 is changed to "five seconds later". Incidentally, it is also possible to store actually required times and to assign the average of them as the presentation timing next time.

Incidentally, although it is also assumed in the present embodiment that it always carries out recognition of the speech content of the fellow passenger, a configuration is also possible which carries out the voice recognition only during a prescribed period (for example, during the period from the time when the fellow passenger starts guidance and pushes down a button for executing the voice recognition to the time when the button is released). In addition, a configuration is also possible which enables the user to determine whether to carry out the recognition always or for a prescribed period.

As described above, according to the present embodiment 3, it is configured in such a manner as to present the guide expression the talker such as a fellow passenger utters at an appropriate timing. Accordingly, in addition to the advantages of the embodiment 1, it can prevent the driver from changing the course at the point where the talker does not intend because the timing of providing the presentation content is too early.

Embodiment 4

Figure 12:
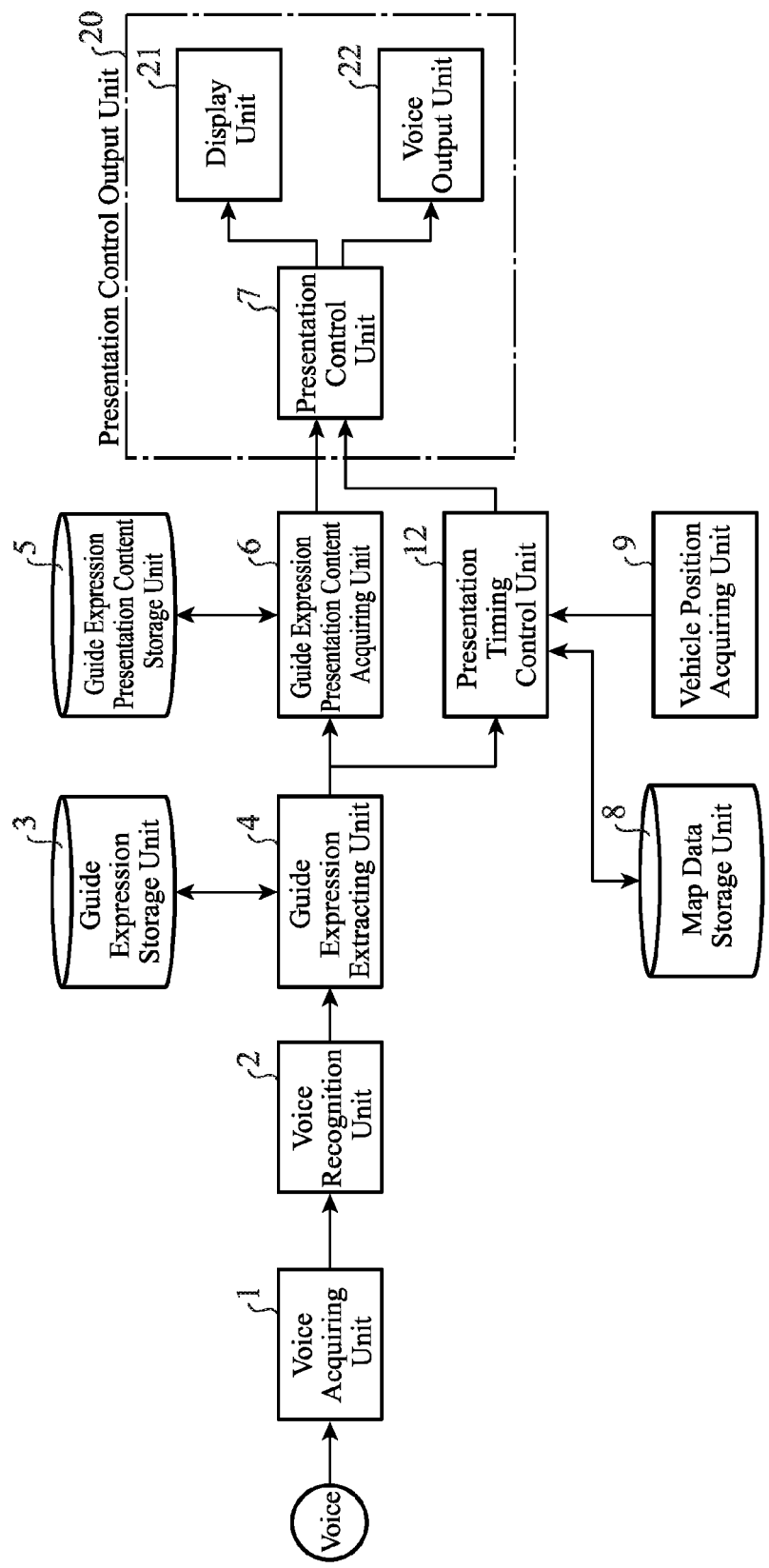
FIG. 12 is a block diagram showing an example of a navigation apparatus of an embodiment 4.

FIG. 12 is a block diagram showing an example of a navigation apparatus of an embodiment 4 in accordance with the present invention. Incidentally, the same components as those described in the embodiments 1-3 are designated by the same reference numerals and their duplicate description will be omitted. As compared with the embodiment 3, the embodiment 4 described below comprises a map data storage unit 8 and a vehicle position acquiring unit (position acquiring unit) 9, and the presentation timing control unit 12 as shown in the embodiment 3 does not determine the presentation timing in accordance with the presentation timing storage unit 11 as shown in FIG. 10 of the embodiment 3, but determines it from the map data and the position of the vehicle (mobile body).

Figure 13:
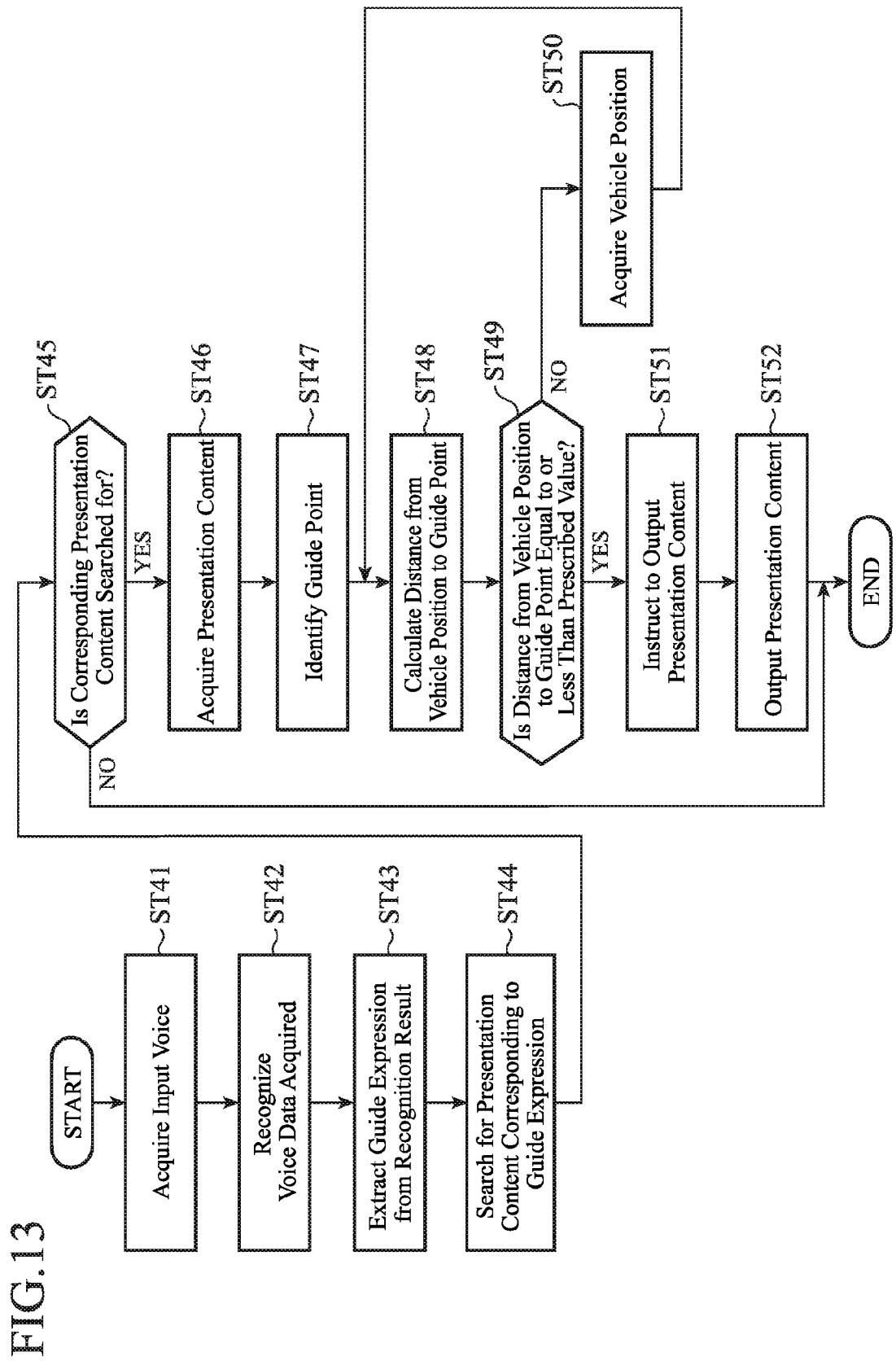
FIG. 13 is a flowchart showing the operation of the navigation apparatus of the embodiment 4.

FIG. 13 is a flowchart showing the operation of the navigation apparatus of the embodiment 4.

As for the processing from step ST41 to ST46, since it is the same as the processing from step ST01 to ST06 in the flowchart of FIG. 4 in the embodiment 1, its description will be omitted. Then, in the present embodiment 4, the presentation timing control unit 12 identifies the guide point for making the guidance from the guide expression extracted by the guide expression extracting unit 4 at step ST43, the vehicle position (the position of the mobile body) acquired by the vehicle position acquiring unit (position acquiring unit) 9, and the map data stored in the map data storage unit 8 (step ST47). After that, the presentation timing control unit 12 calculates the distance from the vehicle position (the position of the mobile body) to the guide point identified at step ST47 (step ST48), and decides on whether the distance is equal to or less than a prescribed value set in advance or not (step ST49). Then, until the distance from the vehicle position (the position of the mobile body) to the guide point becomes equal to or less than the prescribed value (NO at step ST49), the presentation timing control unit 12 acquires the vehicle position (the position of the mobile body) (step ST50) and repeats the processing of calculating the distance (step ST48). Then, if the distance from the vehicle position (the position of the mobile body) to the guide point becomes equal to or less than the prescribed value (YES at step ST49), it determines that timing as the presentation timing, and instructs the output of the presentation content (step ST51) so that the presentation control output unit 20 outputs the presentation content (step ST52).

The processing will be described using a concrete example. For example, when the fellow passenger says "turn right 200 meters ahead", the voice acquiring unit 1 acquires the voice data (step ST41), and the voice recognition unit 2 obtains the recognition result "turn right 200 meters ahead" (step ST42). Then, referring to the guide expression storage unit 3 as shown in FIG. 2, the guide expression extracting unit 4 extracts character strings "turn right" and "200 meters ahead" as guide expressions (step ST43). After that, using the character string "turn right" and the character string "200 meters ahead" as a search key, the guide expression presentation content acquiring unit 6 searches the guide expression presentation content storage unit 5 as shown in FIG. 3 for the guide expression that matches the search key (step ST44). On this occasion, although the guide expression that matches the search key "200 meters ahead" is not found, the guide expression that matches the search key "turn right" is found (YES at step ST45). Thus, it acquires "graphics data of right arrow" or "character string data of "turn right"", which is a visual presentation content corresponding to the guide expression "turn right", or acquires information such as "make the color of the road red" or "make the thickness of the road XX dots" or "voice data "turn right"" which is an auditory presentation content (step ST46). As for the presentation contents that are to be acquired, they can be all the presentation contents stored in the guide expression presentation content storage unit 5 in connection with the guide expression, or only the preset presentation contents when the presentation contents have been set in advance.

Then, the presentation timing control unit 12 locates the guide point (such as an intersection) on the map at which the guidance is given, that is, the position "200 meters ahead" for making "right turn" from the guide expression "200 meters ahead" extracted at step ST43, from the vehicle position acquired by the vehicle position acquiring unit (position acquiring unit) 9 and from the map data (step ST47). After that, until the distance from the vehicle position to the guide point becomes equal to or less than a prescribed value (20 meters, for example) set in advance (step 48-50), the presentation timing control unit 12 repeats the processing of acquiring the vehicle position and calculating the distance to the guide point, and if the distance between the vehicle position and the guide point becomes equal to or less than the prescribed value (20 meters), it instructs to output the presentation content (step ST51). As a result, "graphics data 34 of right arrow" as shown in FIG. 5(*b*), for example, is displayed on the display screen (step ST52).

Incidentally, although it is also assumed in the present embodiment that it always carries out recognition of the speech content of the fellow passenger, a configuration is also possible which carries out the voice recognition only during a prescribed period (for example, during the period from the time when the fellow passenger starts guidance and pushes down a button for executing the voice recognition to the time when the button is released). In addition, a configuration is also possible which enables the user to determine whether to carry out the recognition always or for a prescribed period.

In addition, as for the prescribed value for determining the presentation timing in the present embodiment 4 (for deciding the distance from the vehicle position (the position of the mobile body) to the guide point), it is possible to register it in advance, or to enable a user to set it. In addition, a configuration is also possible which enables a user to decide whether to use a function of determining the presentation timing or not (a function of providing the presentation content after deciding the distance from the vehicle position (the position of the mobile body) to the guide point).

As described above, according to the present embodiment 4, it is configured in such a manner as to present the guide expression the talker such as a fellow passenger utters at an appropriate timing. Accordingly, in the same manner as the embodiment 3, it can prevent the driver from changing the course at the point where the talker does not intend because the timing of providing the presentation content is too early.

Embodiment 5

Figure 14:
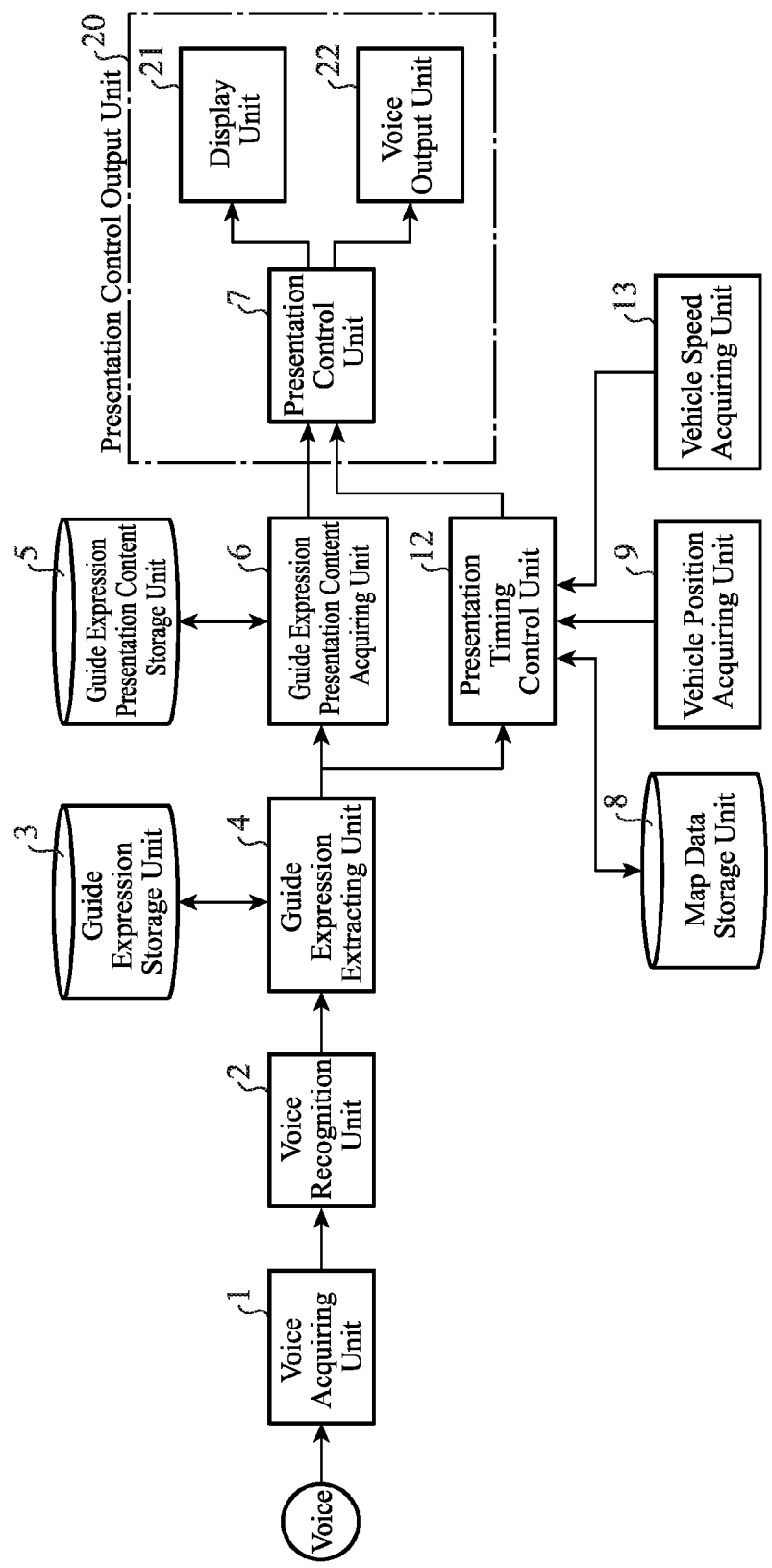
FIG. 14 is a block diagram showing an example of a navigation apparatus of an embodiment 5.

FIG. 14 is a block diagram showing an example of a navigation apparatus of an embodiment 5 in accordance with the present invention. Incidentally, the same components as those described in the embodiments 1-4 are designated by the same reference numerals and their duplicate description will be omitted. As compared with the embodiment 4, the embodiment 5 described below further comprises a vehicle speed acquiring unit (speed acquiring unit) 13, and the presentation timing control unit 12 as shown in embodiment 4 determines the presentation timing not only from the map data and the position of the vehicle (mobile body), but also from the vehicle speed (speed of the mobile body).

Figure 15:
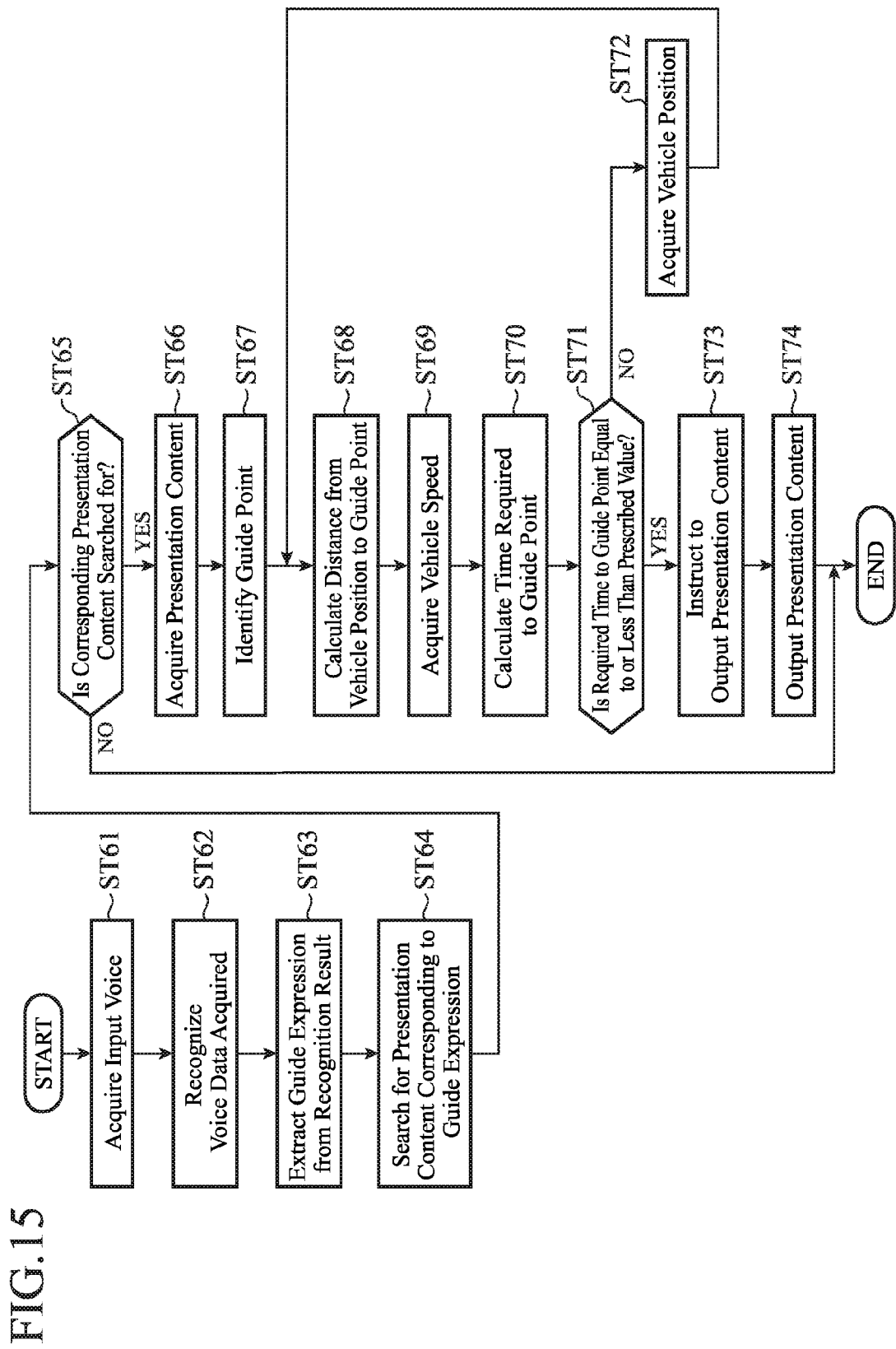
FIG. 15 is a flowchart showing the operation of the navigation apparatus of the embodiment 5.

FIG. 15 is a flowchart showing the operation of the navigation apparatus of the embodiment 5.

As for the processing from step ST61 to ST67, since it is the same as the processing from step ST41 to ST47 in the flowchart of FIG. 13 in the embodiment 4, its description will be omitted. Then, in the present embodiment 5, the presentation timing control unit 12 calculates, in the same manner as at step ST48 of the embodiment 4, the distance from the vehicle position (the position of the mobile body) to the guide point identified at step ST67 (step ST68) after identifying the guide point at which the guidance is given at step ST67, and further the vehicle speed acquiring unit (speed acquiring unit) 13 acquires the vehicle speed (speed of the mobile body) (step ST69). After that, the presentation timing control unit 12 calculates the time required for the vehicle (mobile body) to arrive at the guide point (step ST70) from the distance from the vehicle position (the position of the mobile body) to the guide point calculated step ST68 and from the vehicle speed (speed of the mobile body) acquired at step ST69, and decides on whether the time required is equal to or less than a preset value or not (step ST71). Until the time required becomes equal to or less than the prescribed value (NO at step ST71), the presentation timing control unit 12 repeats the processing of acquiring the vehicle position (the position of the mobile body) (step ST72), calculating the distance (step ST68), acquiring the vehicle speed (the speed of the mobile body) (step ST69), and calculating the time required (step ST70). Then, if the time required for the vehicle (mobile body) to arrive at the guide point becomes equal to or less than the prescribed value (YES step ST71), it determines that that timing is the presentation timing, and instructs to output the presentation content (step ST73), and the presentation control output unit 20 outputs the presentation content (step ST74).

The processing will be described using a concrete example. For example, when the fellow passenger says "turn right 200 meters ahead", the voice acquiring unit 1 acquires the voice data (step ST61), and the voice recognition unit 2 obtains the recognition result "turn right 200 meters ahead" (step ST62). Then, referring to the guide expression storage unit 3 as shown in FIG. 2, the guide expression extracting unit 4 extracts character strings "turn right" and "200 meters ahead" as guide expressions (step ST63). After that, using the character string "turn right" and the character string "200 meters ahead" as a search key, the guide expression presentation content acquiring unit 6 searches the guide expression presentation content storage unit 5 as shown in FIG. 3 for the guide expression that matches the search key (step ST64). On this occasion, although the guide expression that matches the search key "200 meters ahead" is not found, the guide expression that matches the search key "turn right" is found (YES at step ST65). Thus, it acquires "graphics data of right arrow" or "character string data of "turn right"", which is a visual presentation content corresponding to the guide expression "turn right", or acquires information such as "make the color of the road red" or "make the thickness of the road XX dots" or "voice data "turn right"" which is an auditory presentation content (step ST66). As for the presentation contents that are to be acquired, they can be all the presentation contents stored in the guide expression presentation content storage unit 5 in connection with the guide expression, or only the preset presentation contents when the presentation contents have been set in advance.

Then, the presentation timing control unit 12 locates the guide point (such as an intersection) on a map at which the guidance is given, that is, the position "200 meters ahead" for making "right turn" from the guide expression "200 meters ahead" extracted at step ST43, from the vehicle position acquired by the vehicle position acquiring unit (position acquiring unit) 9 and from the map data (step ST67). After that, the presentation timing control unit 12 calculates the distance from the vehicle position to the guide point (step ST68), acquires the vehicle speed from the vehicle speed acquiring unit (speed acquiring unit) 13 (step ST69), and calculates the time required to the guide point (step ST70). For example, when the distance from the vehicle position to the guide point is 200 meters and the vehicle speed is 60 km/h, the time required for the vehicle to arrive at the guide point is 12 seconds. On the other hand, if the vehicle speed covering the same distance is 20 km/h, the time required for the vehicle to arrive at the guide point is 36 seconds. Then, the presentation timing control unit 12 repeats the processing of acquiring the vehicle position and calculating the distance to the guide point, and of acquiring the vehicle speed and calculating the time required to arrive at the guide point until the time required becomes equal to or less than a prescribed value (10 seconds, for example) set in advance (step 68-72), and if the time required for the vehicle to arrive at the guide position becomes equal to or less than the prescribed value (10 seconds), it instructs to output the presentation content (step ST73). As a result, "graphics data 34 of right arrow" as shown in FIG. 5(b), for example, is displayed on the display screen (step ST74).

Incidentally, although it is also assumed in the present embodiment that it always carries out recognition of the speech content of the fellow passenger, a configuration is also possible which carries out the voice recognition only during a prescribed period (for example, during the period from the time when the fellow passenger starts guidance and pushes down a button for executing the voice recognition to the time when the button is released). In addition, a configuration is also possible which enables the user to determine whether to carry out the recognition always or for a prescribed period.

In addition, as for the prescribed value for determining the presentation timing in the present embodiment 5 (for deciding the time required for the vehicle (mobile body) to arrive at the guide point), it is possible to register it in advance, or to enable a user to set it. In addition, a configuration is also possible which enables a user to decide whether to use a function of determining the presentation timing or not (a function of providing the presentation content after deciding the time required for the vehicle (mobile body) to arrive at the guide point).

As described above, according to the present embodiment 5, it is configured in such a manner as to present the guide expression the talker such as a fellow passenger utters at an appropriate timing. Accordingly, in the same manner as the embodiment 3 or 4, it can prevent the driver from changing the course at the point where the talker does not intend because the timing of providing the presentation content is too early.

Embodiment 6

Figure 16:
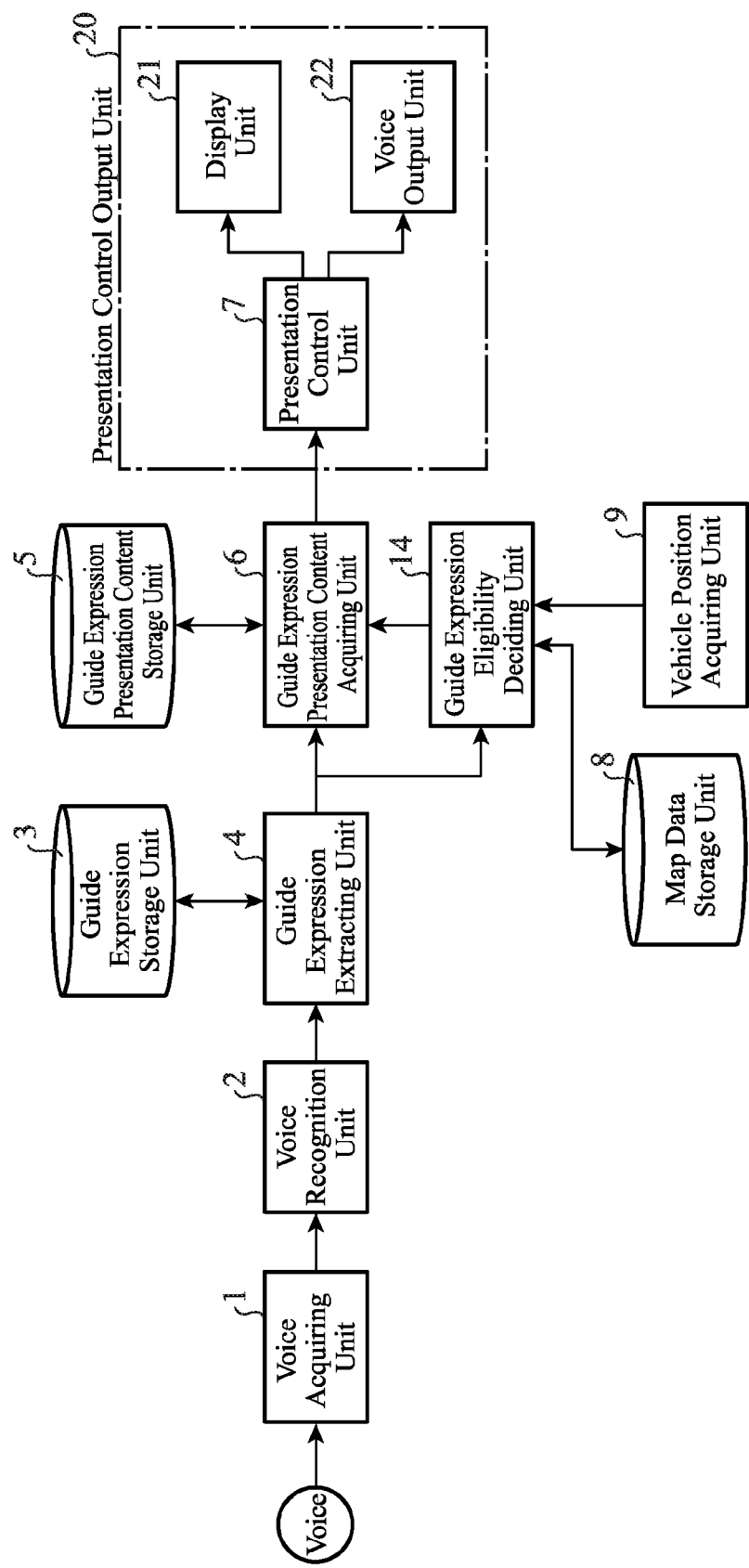
FIG. 16 is a block diagram showing an example of a navigation apparatus of an embodiment 6.

FIG. 16 is a block diagram showing an example of a navigation apparatus of an embodiment 6 in accordance with the present invention. Incidentally, the same components as those described in the embodiments 1-5 are designated by the same reference numerals and their duplicate description will be omitted. As compared with the embodiment 1, the embodiment 6 described below comprises a map data storage unit 8, a vehicle position acquiring unit (position acquiring unit) 9 and a guide expression eligibility deciding unit 14, and presents the guide expression after deciding on whether the presentation content is eligible or not.

The guide expression eligibility deciding unit 14 decides the eligibility as to whether the presentation content should be provided or not. Here, the term "eligibility" refers to whether the vehicle can pass through in the direction instructed by a talker, or whether the vehicle does not deviate from the route set when it goes to the direction instructed.

Figure 17:
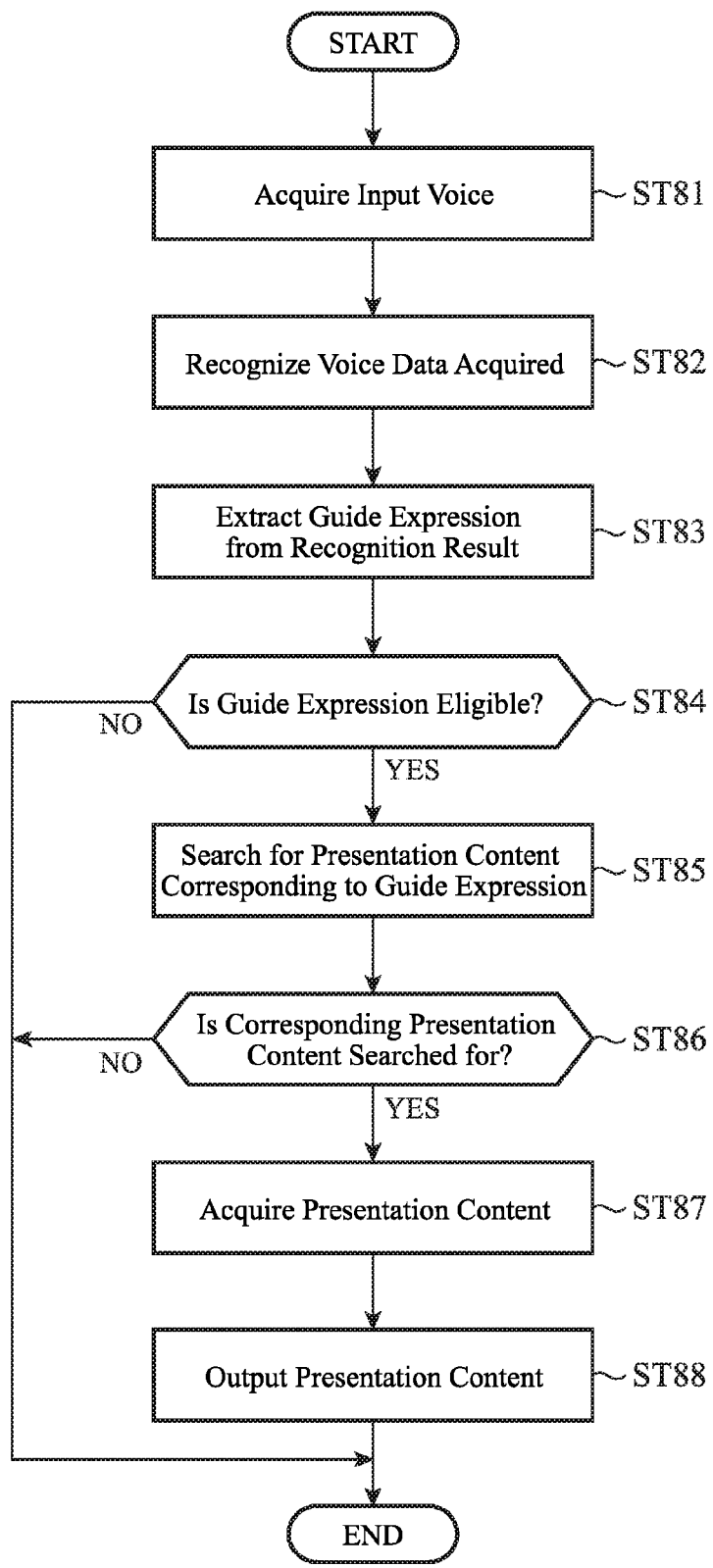
FIG. 17 is a flowchart showing the operation of the navigation apparatus of the embodiment 6.

FIG. 17 is a flowchart showing the operation of the navigation apparatus of the embodiment 6.

As for the processing from step ST81 to ST83, since it is the same as the processing from step ST01 to ST03 in the flowchart of FIG. 4 in the embodiment 1, its description will be omitted. Then, in the present embodiment 6, the guide expression eligibility deciding unit 14 decides on whether it is eligible to present the guide expression or not from the guide expression extracted by the guide expression extracting unit at step ST83, from the vehicle position (the position of the mobile body) acquired by the vehicle position acquiring unit (position acquiring unit) 9, and from the map data stored in the map data storage unit 8 (step ST84). On this occasion, when the guide expression eligibility deciding unit 14 decides that it is eligible (YES at step ST84), the guide expression presentation content acquiring unit 6 searches for the presentation content which corresponds to the guide expression in the same manner as the steps ST04 to ST06 of FIG. 4 in the embodiment 1 (step ST85), and if it finds the corresponding presentation content, it acquires the presentation content and outputs it (steps ST86-ST88).

On the other hand, if it decides at step ST84 that it is ineligible (NO step ST84), the processing is terminated.

The processing will be described using a concrete example. For example, when the fellow passenger says "turn right at the next intersection", the voice acquiring unit 1 acquires the voice data (step ST81), and the voice recognition unit 2 obtains the recognition result "turn right at the next intersection" (step ST82). Then, referring to the guide expression storage unit 3 as shown in FIG. 2, the guide expression extracting unit 4 extracts character strings "turn right" and "the next intersection" (step ST83). On this occasion, the guide expression eligibility deciding unit 14 identifies "the next intersection" from the vehicle position and map data, and if the result of checking the road information about the right turn at the intersection using the map data is no entry because traffic is only one way, for example, it decides that the guide expression is ineligible (NO at step ST84), and terminates the processing. Likewise, if the right turn at the intersection will cause deviation from the route, it also decides that the guide expression is ineligible.

On the other hand, if the guide expression eligibility deciding unit 14 decides that the guide expression is eligible (YES at step ST84), the present embodiment executes the same processing as the processing at steps ST04-ST07 of the embodiment 1 (step ST85-ST88), and outputs the information such as "graphics data of right arrow", "character string data of "turn right"", "make the color of the road red" or "make the thickness of the road XX dots", or outputs "voice data "turn right"" which is an auditory presentation content.

Incidentally, although it is also assumed in the present embodiment that it always carries out recognition of the speech content of the fellow passenger, a configuration is also possible which carries out the voice recognition only during a prescribed period (for example, during the period from the time when the fellow passenger starts guidance and pushes down a button for executing the voice recognition to the time when the button is released). In addition, a configuration is also possible which enables the user to determine whether to carry out the recognition always or for a prescribed period.

In addition, a configuration is also possible which enables the user to decide whether to use the guide expression eligibility decision function in the present embodiment 6 or not.

As described above, according to the present embodiment 6, it is configured in such a manner as to decide on whether the guide expression the talker such as a fellow passenger utters is eligible or not. Accordingly, in addition to the advantages of the embodiment 1, it can prevent the presentation content from being provided in accordance with non-eligible speech of the talker, and prevent the driver from going to a wrong route or from committing a traffic offense.

Embodiment 7

Since a block diagram showing an example of a navigation apparatus of an embodiment 7 in accordance with the present invention is the same as the block diagram shown in FIG. 16 of the embodiment 6, its illustration and description will be omitted. As compared with the embodiment 6, the embodiment 7 described below provides a presentation content which shows, when the guide expression eligibility deciding unit 14 decides that the guide expression is ineligible, that the guide expression is ineligible.

On that occasion, the guide expression presentation content acquiring unit 6 acquires the presentation content indicating that the guide expression is ineligible from the guide expression presentation content storage unit 5. Incidentally, as for the presentation content which indicates that the guide expression is ineligible and which is stored in the guide expression presentation content storage unit 5, although it is not shown in a drawing, the guide expression presentation content storage unit 5 stores, for example, graphics data "X" or a character string "impassable" or "deviate from the route" as a presentation content corresponding to the case where the guide expression eligibility deciding unit 14 decides that the guide expression is ineligible.

Figure 18:
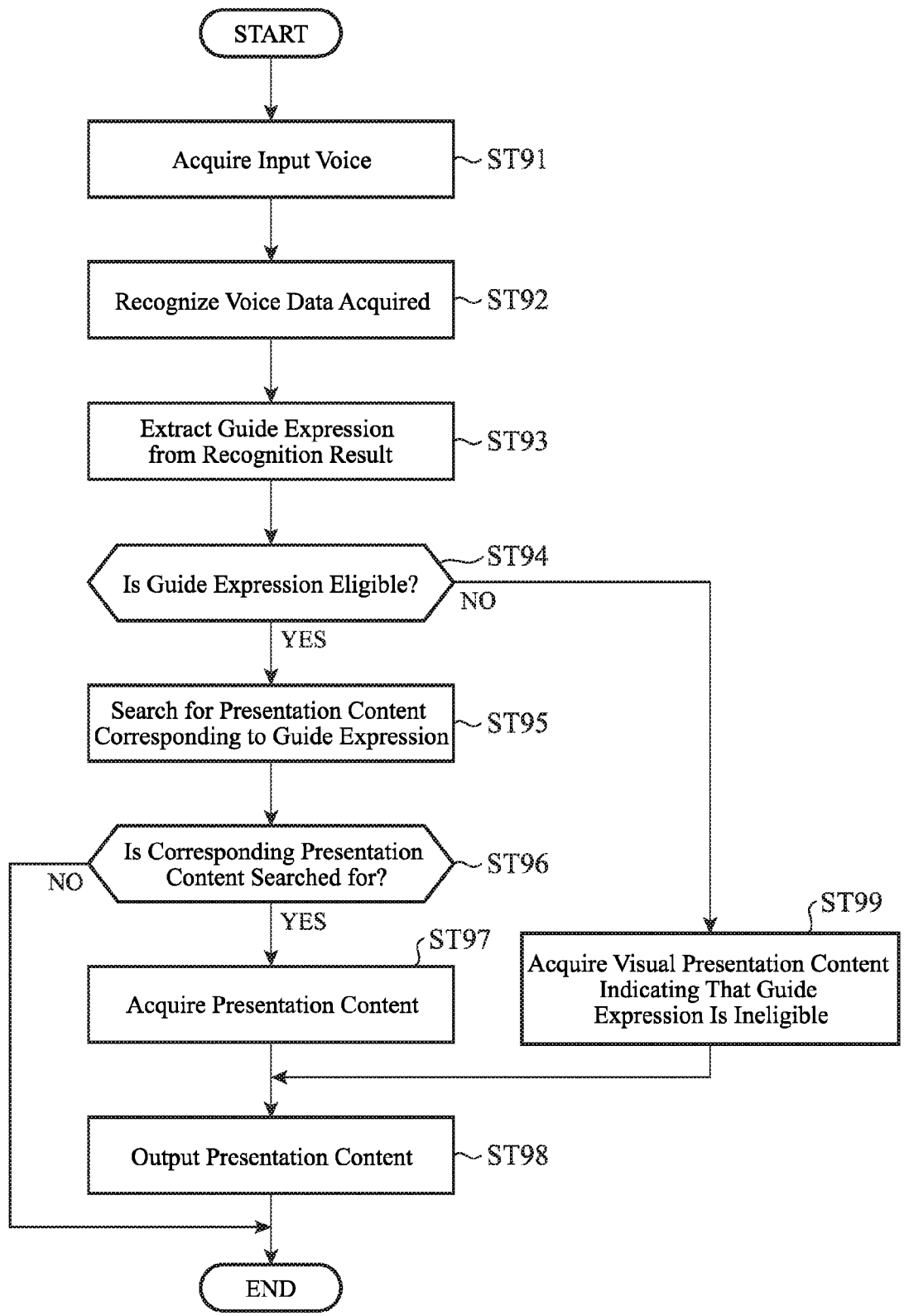
FIG. 18 is a flowchart showing the operation of the navigation apparatus of an embodiment 7.

FIG. 18 is a flowchart showing the operation of the navigation apparatus of the embodiment 7.

As for the processing from step ST91 to ST98, since it is the same as the processing from step ST81 to ST88 in the flowchart of FIG. 17 of the embodiment 6, its description will be omitted. Then, in the present embodiment 7, if the guide expression eligibility deciding unit 14 decides that it is eligible to present the guide expression when making a decision as to whether it is eligible or not at step ST94 (YES at step ST94), the present embodiment searches for the presentation content which corresponds to the guide expression in the same manner as at steps ST85-ST88 of FIG. 17 in the embodiment 6 (step ST95), and when the corresponding presentation content is found, it acquires the presentation content and outputs it (steps ST96-ST98).

On the other hand, if the guide expression eligibility deciding unit 14 decides that it is ineligible at step ST94 (NO at step ST94), although it merely terminates the processing in the embodiment 6, the guide expression presentation content acquiring unit 6 in the present embodiment 7 acquires the presentation content indicating that the guide expression is ineligible (step ST99) and outputs the presentation content (step ST98).

The processing will be described using a concrete example. For example, when the fellow passenger says "turn right at the next intersection" as in the embodiment 6, the voice acquiring unit 1 acquires the voice data (step ST91), and the voice recognition unit 2 obtains the recognition result "turn right at the next intersection" (step ST92). Then, referring to the guide expression storage unit 3 as shown in FIG. 2, the guide expression extracting unit 4 extracts character strings "turn right" and "the next intersection" (step ST93). On this occasion, the guide expression eligibility deciding unit 14 identifies "the next intersection" from the vehicle position and map data, and if the check result of the road information about the right turn at the intersection using the map data is no entry because traffic is only one way, for example, it decides that the guide expression is ineligible (NO at step ST94). Likewise, if the right turn at the intersection will cause deviation from the route, it also decides that the guide expression is ineligible. On this occasion, the guide expression presentation content acquiring unit 6 acquires from the guide expression presentation content storage unit 5 the graphics data such as "X", the character string data "impassable", or the character string data "deviate from the route".

Incidentally, although it is also assumed in the present embodiment that it always carries out recognition of the speech content of the fellow passenger, a configuration is also possible which carries out the voice recognition only during a prescribed period (for example, during the period from the time when the fellow passenger starts guidance and pushes down a button for executing the voice recognition to the time when the button is released). In addition, a configuration is also possible which enables the user to determine whether to carry out the recognition always or for a prescribed period.

In addition, a configuration is also possible which enables the user to decide whether to use the guide expression eligibility decision function in the present embodiment 7 or not.

As described above, according to the present embodiment 7, it is configured in such a manner that it decides on whether the guide expression the talker such as a fellow passenger utters is eligible or not, and if it is ineligible, it presents a fact that it is ineligible. Accordingly, in addition to the advantages of the embodiment 1, it can not only prevent the presentation content from being provided in accordance with non-eligible speech of the talker, but also make the driver know that the speech content the driver recognizes is ineligible, thereby being able to prevent the driver from going to a wrong route or from committing a traffic offense.

Embodiment 8

Figure 19:
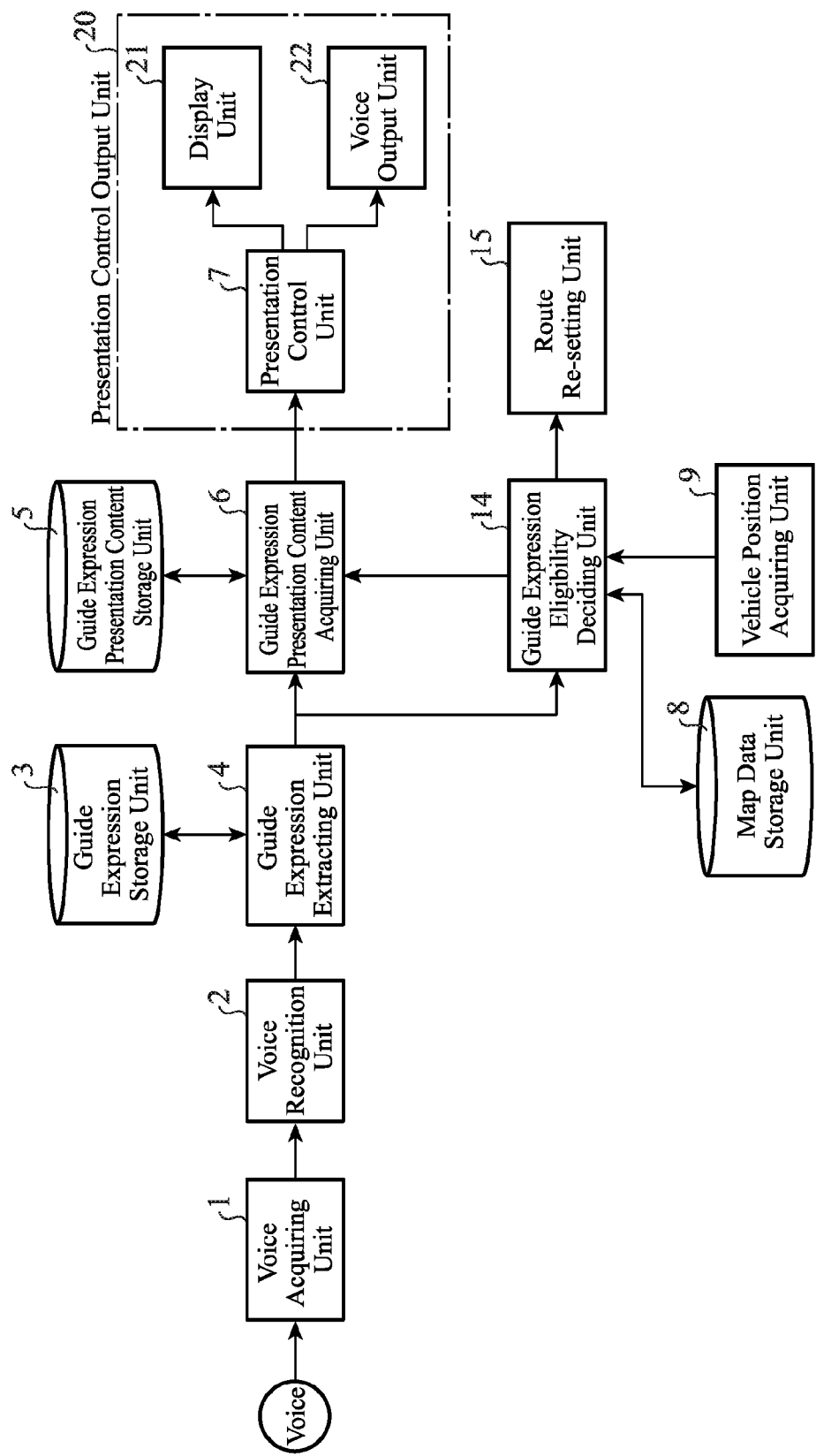
FIG. 19 is a block diagram showing an example of a navigation apparatus of an embodiment 8.

FIG. 19 is a block diagram showing an example of a navigation apparatus of an embodiment 8 in accordance with the present invention. Incidentally, the same components as those described in the embodiments 1-7 are designated by the same reference numerals and their duplicate description will be omitted. As compared with the embodiment 6, the embodiment 8 described below further comprises a route re-setting unit 15, and when the guide expression eligibility deciding unit 14 decides that the presentation content (guide expression) is ineligible because of deviation from the route previously set, it sets a route again which passes through the deviation route and leads to the destination.

The route re-setting unit 15 sets the route again which passes through the deviation route and leads to the destination when the guide expression eligibility deciding unit 14 decides that the guide expression is ineligible because of the deviation from the route set.

Figure 20:
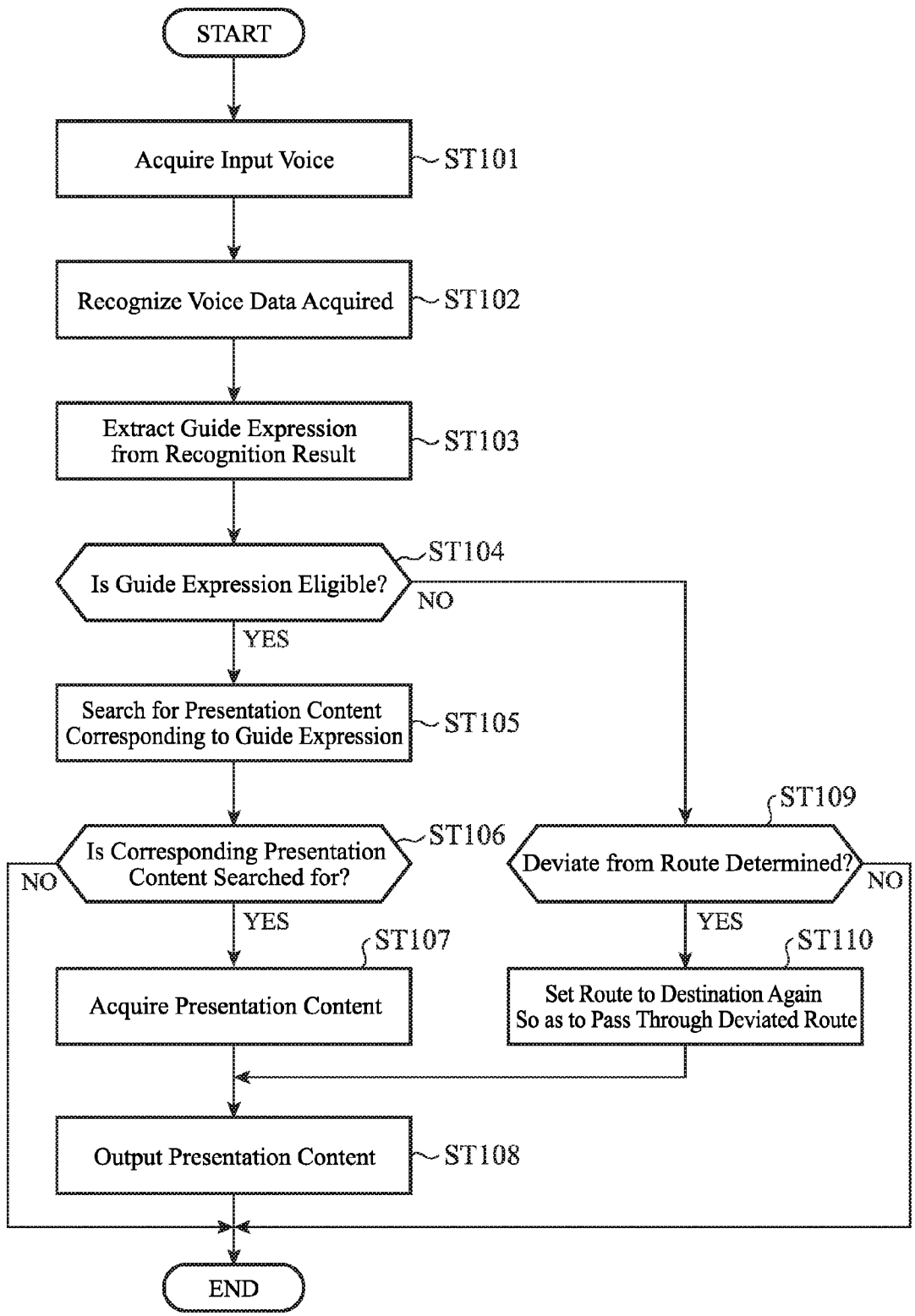
FIG. 20 is a flowchart showing the operation of the navigation apparatus of the embodiment 8.

FIG. 20 is a flowchart showing the operation of the navigation apparatus of the embodiment 8.

As for the processing from step ST101 to ST108, since it is approximately the same as the processing from step ST81 to ST88 in the flowchart of FIG. 17 in the embodiment 6, its description will be omitted. Then, in the present embodiment 8, if the guide expression eligibility deciding unit 14 decides that it is eligible (YES at step ST104) when making a decision on whether it is eligible to present the guide expression or not at step ST104, the guide expression present content acquiring unit 6 searches for the present content corresponding to the guide expression in the same manner as at steps ST85-ST88 of FIG. 17 in the embodiment 6, and if it finds the corresponding presentation content, it obtains and outputs the presentation content (step ST106-ST108).

On the other hand, if the guide expression eligibility deciding unit 14 decides at step ST84 that it is ineligible (NO step ST104), although it simply terminates the processing in the embodiment 6, it further decides on whether the guide expression is ineligible because it deviates from the route set or not (step ST109). If it decides at step ST109 that it is ineligible because it deviates from the route set (YES at step ST109), the route re-setting unit 15 sets a route to the destination again in such a manner that the route passes through the deviation route (step ST110). On the other hand, if it decides that it is ineligible because of other reason (NO at step ST109), the processing is terminated.

The processing will be described using a concrete example. For example, when the fellow passenger says "turn right at the next intersection" as in the embodiment 6, the voice acquiring unit 1 acquires the voice data (step ST101), and the voice recognition unit 2 obtains the recognition result "turn right at the next intersection" (step ST102). Then, referring to the guide expression storage unit 3 as shown in FIG. 2, the guide expression extracting unit 4 extracts character strings "turn right" and "the next intersection" (step ST103). On this occasion, the guide expression eligibility deciding unit 14 identifies "the next intersection" from the vehicle position and map data, and if the check result of the road information about the right turn at the intersection using the map data is no entry because traffic is only one way, for example, it decides that the guide expression is ineligible (NO at step ST104). Furthermore, the guide expression eligibility deciding unit 14 decides the reason for deciding that it is ineligible is due to the deviation from the route set or not (step ST109), and because it is NO in this case, it terminates the processing. On the other hand, if the decision at step ST104 indicates that the right turn at the intersection will cause the vehicle to deviate from the route set, the guide expression eligibility deciding unit 14 decides that the guide expression is ineligible at step ST104 (NO at step ST104). In this case, since the reason for deciding that it is ineligible is due to the deviation from the route set (YES at step ST109), the route re-setting unit 15 sets the route to the destination again in such a manner as to pass through the deviation route (step ST110).

Incidentally, although it is also assumed in the present embodiment that it always carries out recognition of the speech content of the fellow passenger, a configuration is also possible which carries out the voice recognition only during a prescribed period (for example, during the period from the time when the fellow passenger starts guidance and pushes down a button for executing the voice recognition to the time when the button is released). In addition, a configuration is also possible which enables the user to determine whether to carry out the recognition always or for a prescribed period.

In addition, a configuration is also possible which enables the user to decide whether to use the guide expression eligibility decision function in the present embodiment 8 or not.

As described above, according to the present embodiment 8, it is configured in such a manner that it decides on whether the guide expression the talker such as a fellow passenger utters is eligible or not, and if it decides that it is ineligible because of deviation from the route, it sets a route to the destination again in such a manner as to pass through the deviation route. Accordingly, in addition to the advantages of the embodiment 1, it can prevent, when the talker makes a guidance to change the route intentionally, the intention from being disregarded because of the decision that it is ineligible.

Embodiment 9

Figure 21:
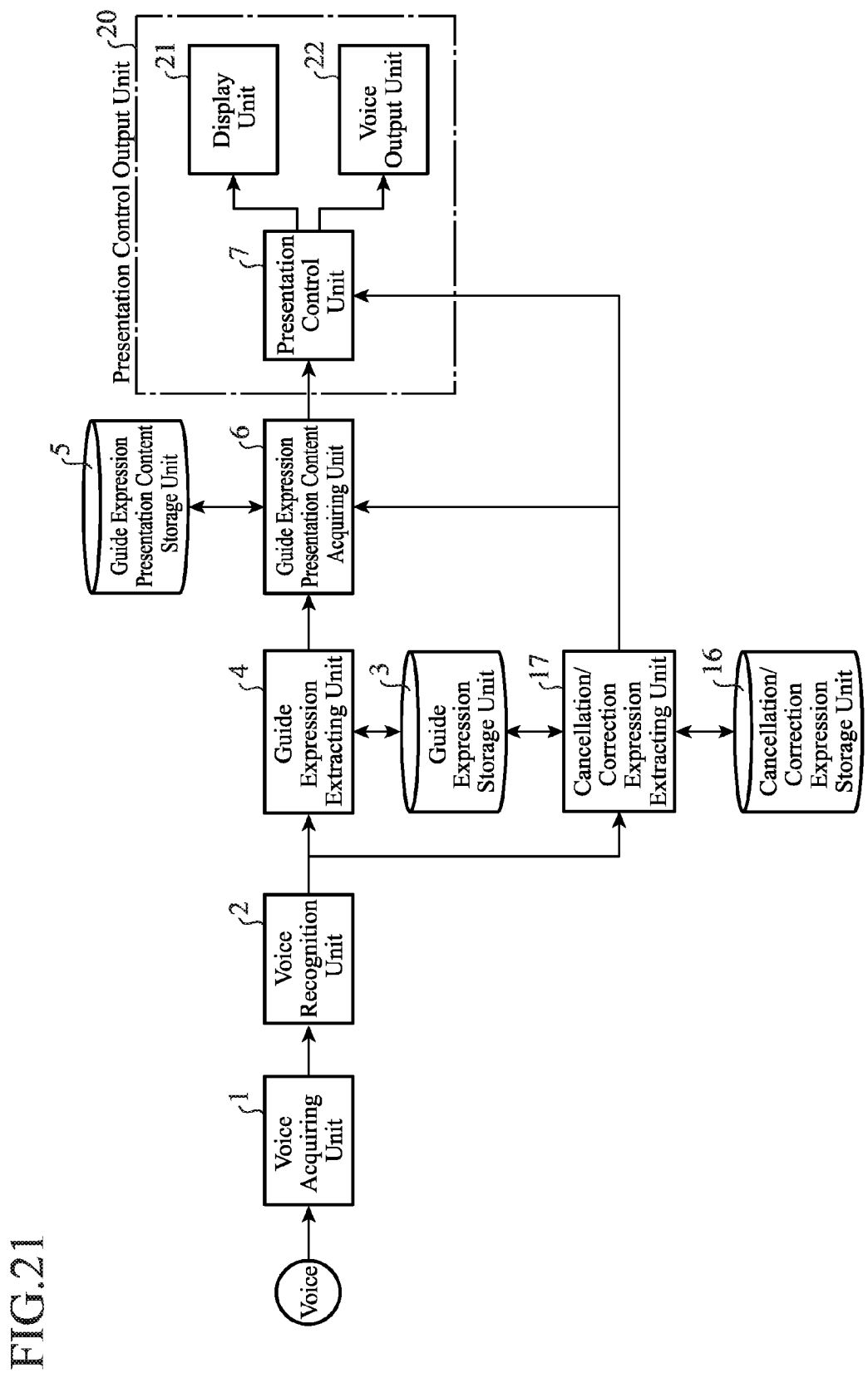
FIG. 21 is a block diagram showing an example of a navigation apparatus of an embodiment 9.

FIG. 21 is a block diagram showing an example of a navigation apparatus of an embodiment 9 in accordance with the present invention. Incidentally, the same components as those described in the embodiments 1-8 are designated by the same reference numerals and their duplicate description will be omitted. As compared with the embodiment 1, the embodiment 9 described below further comprises a cancellation/correction expression storage unit 16 and a cancellation/correction expression extracting unit 17, and is configured in such a manner that when an expression for canceling the presentation of the presentation content is extracted, it does not output the presentation content, and when an expression for correcting the presentation of the presentation content is extracted, it outputs the presentation content after the correction.

The cancellation/correction expression storage unit 16 stores expressions that are supposed to be used when a person may mistakenly say guidance or may make a mistake in guidance in general.

FIG. 22 is a diagram showing an example of the cancellation/correction expression storage unit 16. As shown in FIG. 22, the cancellation/correction expression storage unit 16 stores cancellation expressions such as "wrong", "made a mistake", and "made an error", and correction expressions such as "not . . . but" and "undo".

Referring to the cancellation/correction expression storage unit 15, the cancellation/correction expression extracting unit 17 carries out morphological analysis, and extracts a cancellation expression and correction expression from a character string which is a voice recognition result of the voice recognition unit 2. In addition, when extracting the correction expression, it refers to the guide expression storage unit 3 and extracts a guide expression following the correction expression, that is, a guide expression after the correction.

Figure 23:
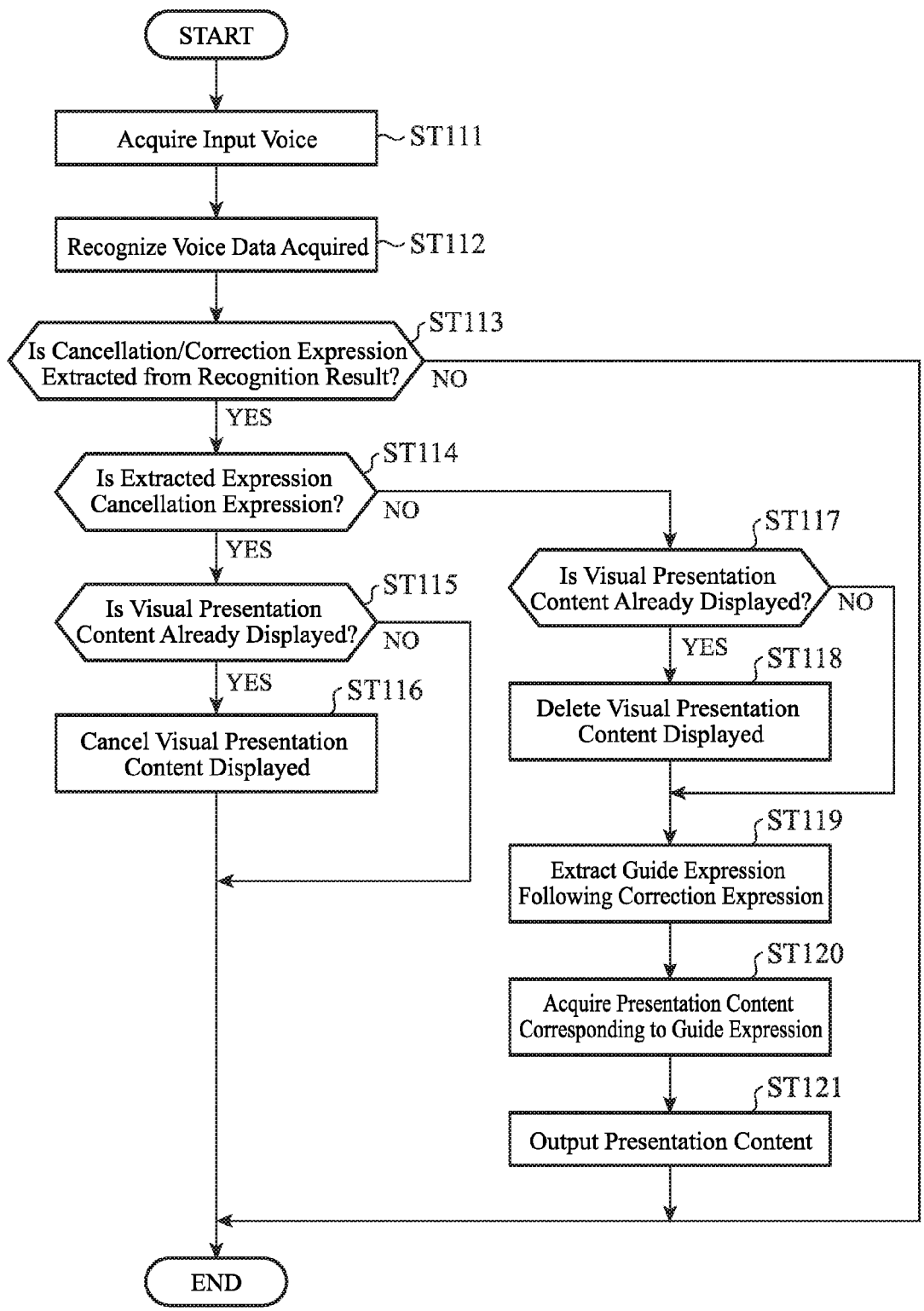
FIG. 23 is a flowchart showing the operation of the navigation apparatus of the embodiment 9.

FIG. 23 is a flowchart showing the operation of the navigation apparatus of the embodiment 9.

As for the processing at step ST111 and ST112, since it is the same as the processing at step ST01 and ST02 in the flowchart of FIG. 4 in the embodiment 1, its description will be omitted. Then, in the present embodiment 9, the guide expression extracting unit 4, referring to the guide expression storage unit 3, extracts a guide expression from the recognition result of the voice recognition unit 2 at step ST112, and the cancellation/correction expression extracting unit 17, referring to the cancellation/correction expression storage unit 16, extracts a cancellation/correction expression. On this occasion, if the cancellation/correction expression extracting unit 17 does not extract any cancellation/correction expression (NO at step ST113), it terminates the processing in the flowchart, and the guide expression extracting unit 4 executes the processing of extracting and providing the guide expression as in the embodiment 1 (here, its drawing and description will be omitted).

If the cancellation/correction expression extracting unit 17 extracts the cancellation/correction expression stored in the cancellation/correction expression storage unit 16 (YES at step ST113), and if the extracted cancellation/correction expression is a cancellation expression such as "made an error" (YES at step ST114), the cancellation correction expression extracting unit 17 notifies the presentation control unit 7 of canceling, when the presentation content is a visual presentation content, the display of the visual presentation content. More specifically, when the visual presentation content has already been displayed (YES at step ST115), the presentation control unit 7 undoes the display of the visual presentation content (step ST116). In addition, if the visual presentation content is not yet displayed (NO at step ST115), it terminates the processing without displaying anything.

On the other hand, when the expression extracted by the cancellation/correction expression extracting unit 17 is not a cancellation expression, but a correction expression such as "not . . . but" (NO at step ST114), and if the visual presentation content has already been displayed (YES at step ST117), the presentation control unit 7 undoes the display of the visual presentation content (step ST118). In addition, if the visual presentation content is not yet displayed (NO at step ST117), it simply executes the processing at step ST119. At step ST119, the cancellation/correction expression extracting unit 17, referring to the guide expression storage unit 3, extracts the guide expression following the correction expression (step ST119). Then, according to the guide expression, the guide expression presentation content acquiring unit 6 acquires the corresponding presentation content (step ST120), and the presentation control output unit 20 outputs the presentation content (step ST121).

The processing will be described using a concrete example. For example, when the fellow passenger says "turn right at the next intersection", followed by "Oh! I made a mistake", the voice acquiring unit 1 acquires the voice data (step ST111), and the voice recognition unit 2 obtains the recognition result "turn right at the next intersection" and "Oh! I made a mistake" (step ST112). On this occasion, the cancellation/correction expression extracting unit 17, referring to the cancellation/correction expression storage unit 16, extracts a character string "made a mistake" as a cancellation expression. In other words, since it extracts the cancellation/correction expression from the voice recognition result (YES at step ST113) and because the extracted expression is a cancellation expression (YES at step ST114), if the visual presentation content expressing "turn right" has already been displayed (YES at step ST115), the presentation control unit 7 undoes the display of the visual presentation content (step ST116). In contrast, if the visual presentation content is not yet displayed (NO at step ST115), it terminates the processing without displaying anything.

Figure 24:
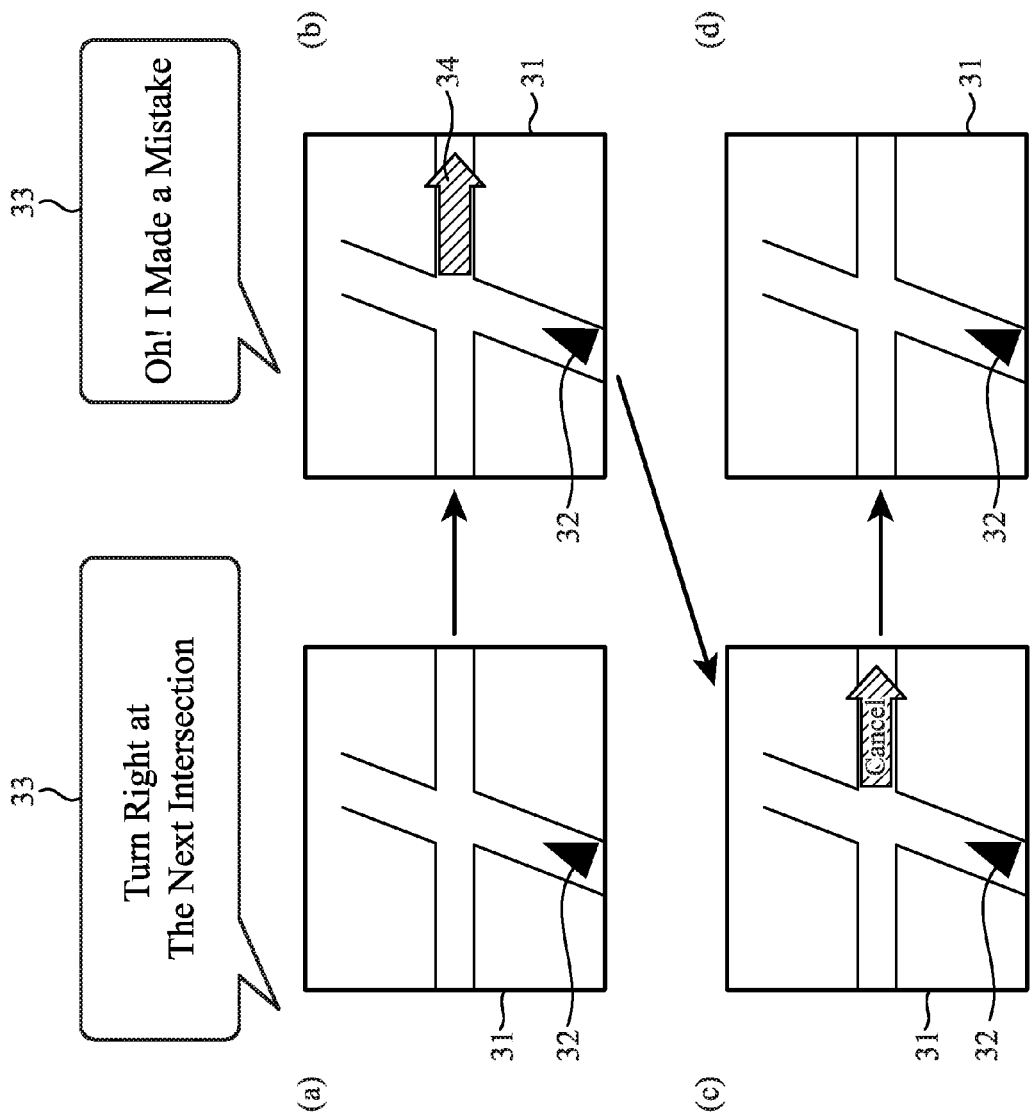
FIG. 24 is a diagram showing an example of a screen transition when a cancellation expression is extracted in the embodiment 9.

FIG. 24 is a diagram showing an example of a screen transition when the cancellation expression is extracted: FIG. 24(a) shows a display screen on which the vehicle 32 is displayed by a triangle on a navigation screen 31, and shows a state in which the fellow passenger utters "turn right at the next intersection" and the speech content is shown in a balloon 33. Then, FIG. 24(b) shows a state in which as a result that the navigation apparatus executes the processing of outputting the presentation content as described in the embodiment 2 on this occasion, a "graphics data of right arrow" 34 is displayed on the road through which the vehicle will pass after the right turn on the same navigation screen 31 as that shown in FIG. 24(a) as the visual presentation content, and shows a state in which the fellow passenger utters "Oh! I made a mistake". Incidentally, as for the speech content, it is also shown in the balloon 33. Thus, the processing from step ST114 to ST116 is executed in the processing of the flowchart of FIG. 23 described before, and the display of the "graphics data of right arrow" 34 is canceled (see FIG. 24(c)), and the state as shown in FIG. 24(d) appears. Incidentally, the speech content of the fellow passenger is such a set as "turn right at the next intersection. Oh! I made a mistake.", and if the cancellation expression "I make a mistake" is extracted before the visual presentation content as shown in FIG. 24(b), the processing is terminated without displaying anything. More specifically, the state of FIG. 24(a) makes a direct transition to the state of FIG. 24(d) without changing the display.

In addition, when the fellow passenger utters "not turn right but turn left at the next intersection", the cancellation/correction expression extracting unit 17 extracts the correction expression "not . . . but". Thus, since the decision at step ST114 is NO, it extracts "turn left" by referring to the guide expression storage unit 3 as the guide expression that follows "not . . . but" (step ST119). Then, referring to the guide expression presentation content storage unit 5, the guide expression presentation content acquiring unit 6 acquires the presentation content corresponding to the "turn left" (step ST120), and displays it or outputs it in voice (step ST121).

Figure 25:
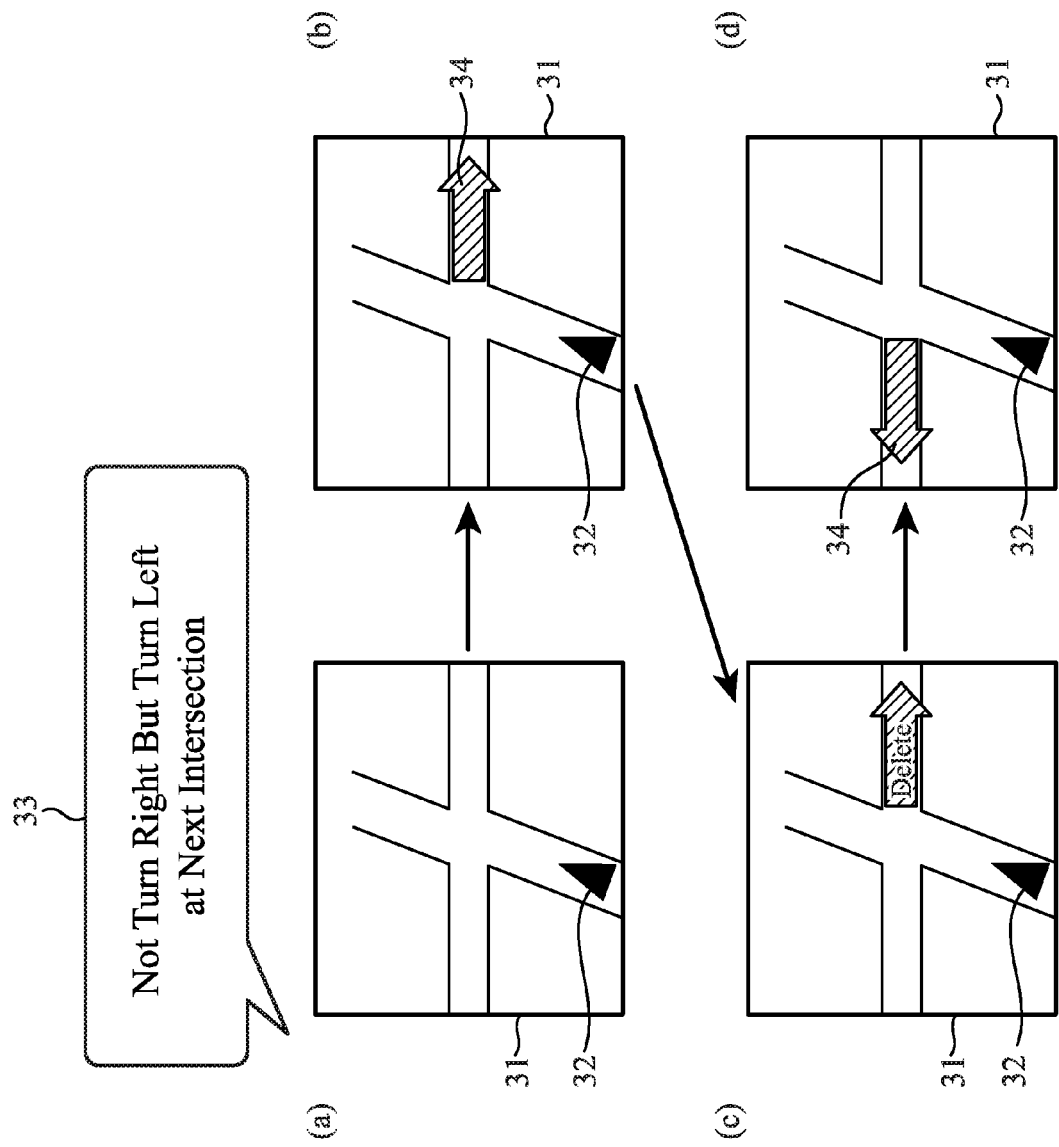
FIG. 25 is a diagram showing an example of a screen transition when a correction expression is extracted in the embodiment 9.

FIG. 25 is a diagram showing an example of a screen transition when a correction expression is extracted: FIG. 25(*a*) shows a display screen on which the vehicle 32 is displayed by a triangle on the navigation screen 31, and shows a state in which the fellow passenger utters the speech "not turn right but turn left at the next intersection" and the speech content is shown in the balloon 33. Then, FIG. 25(*b*) shows a state in which as a result that the navigation apparatus executes the processing of outputting the presentation content as described in the embodiment 2 on this occasion, a "graphics data of right arrow" 34 is displayed on the road through which the vehicle will pass after the right turn on the same navigation screen 31 as that in FIG. 25(*a*) as the visual presentation content. However, since the speech content contains the correction expression "not . . . but", and the correction expression is extracted, the processing of step ST114 and ST117-ST118 is executed in the processing of the flowchart shown in the foregoing FIG. 23, and the display "graphics data of right arrow" 34 is deleted (see FIG. 25(*c*)). Furthermore, since "turn left" is extracted as the guide expression following "not . . . but", the processing of step ST119-ST121 in the flowchart shown in FIG. 23 is executed, and "graphics data of left arrow" 34 corresponding to the "turn left" is displayed as shown in FIG. 25(*d*). Incidentally, if the correction expression "not . . . but" is extracted before the visual presentation content as shown in FIG. 25(*b*) is displayed, the state of FIG. 25(*a*) makes a direct transition to the state of FIG. 25(*d*).

Incidentally, although it is also assumed in the present embodiment that it always carries out recognition of the speech content of the fellow passenger, a configuration is also possible which carries out the voice recognition only during a prescribed period (for example, during the period from the time when the fellow passenger starts guidance and pushes down a button for executing the voice recognition to the time when the button is released). In addition, a configuration is also possible which enables the user to determine whether to carryout the recognition always or for a prescribed period.

In addition, although the present embodiment 9 is described on the assumption that if the visual presentation content to be canceled has already been displayed, it should be canceled (deleted), a configuration is also possible which enables a user to decide whether to cancel the visual presentation content which is displayed, or to display both the presentation content and the visual presentation content indicating the cancellation. In addition, a configuration is also possible which enables a user to decide whether to employ the function of extracting the cancellation/correction expression in the present embodiment 9 or not.

As described above, according to the present embodiment 9, it is configured in such a manner that it extracts the cancellation/correction expression if it is contained in the guide expression the talker such as a fellow passenger utters. Accordingly, in addition to the advantages of the embodiment 1, it can prevent the driver from going to a wrong route by taking it into account that the talker such as a fellow passenger makes wrong guidance and by canceling or correcting the visual presentation content to be canceled.

Embodiment 10

Figure 26:
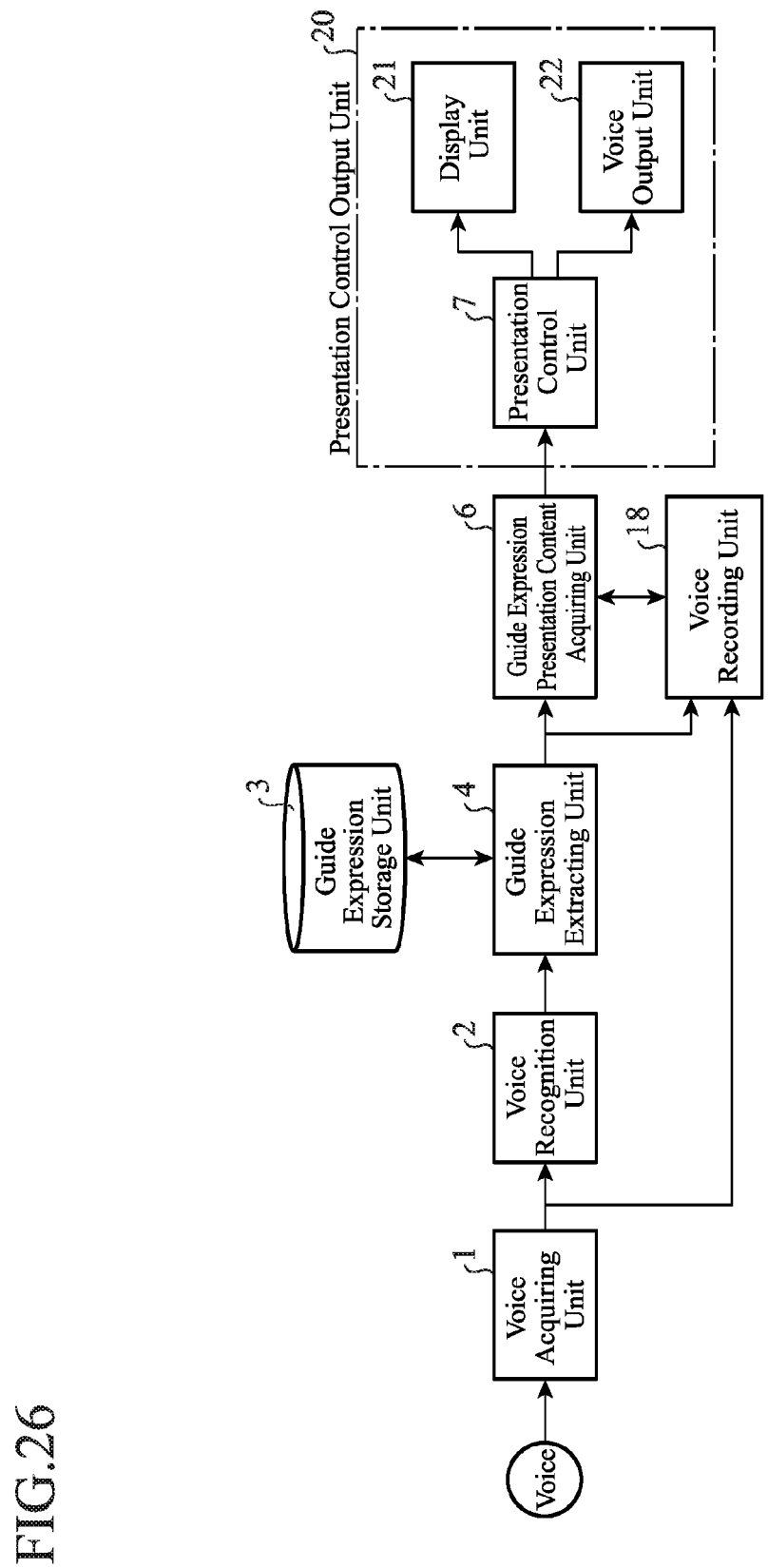
FIG. 26 is a block diagram showing an example of a navigation apparatus of an embodiment 10.

FIG. 26 is a block diagram showing an example of a navigation apparatus of an embodiment 10 in accordance with the present invention. Incidentally, the same components as those described in the embodiments 1-9 are designated by the same reference numerals and their duplicate description will be omitted. As compared with the embodiment 1, the embodiment 10 described below comprises a voice recording unit 18 instead of the guide expression presentation content storage unit 5.

The voice recording unit 18 stores the voice data acquired by the voice acquiring unit 1 in connection with the guide expression extracted by the guide expression extracting unit 4. Then, the guide expression presentation content acquiring unit 6, referring to the voice recording unit 18, acquires the voice data corresponding to the guide expression extracted by the guide expression extracting unit 4 as the presentation content (auditory presentation content), and the presentation control output unit 20 outputs the presentation content.

Figure 27:
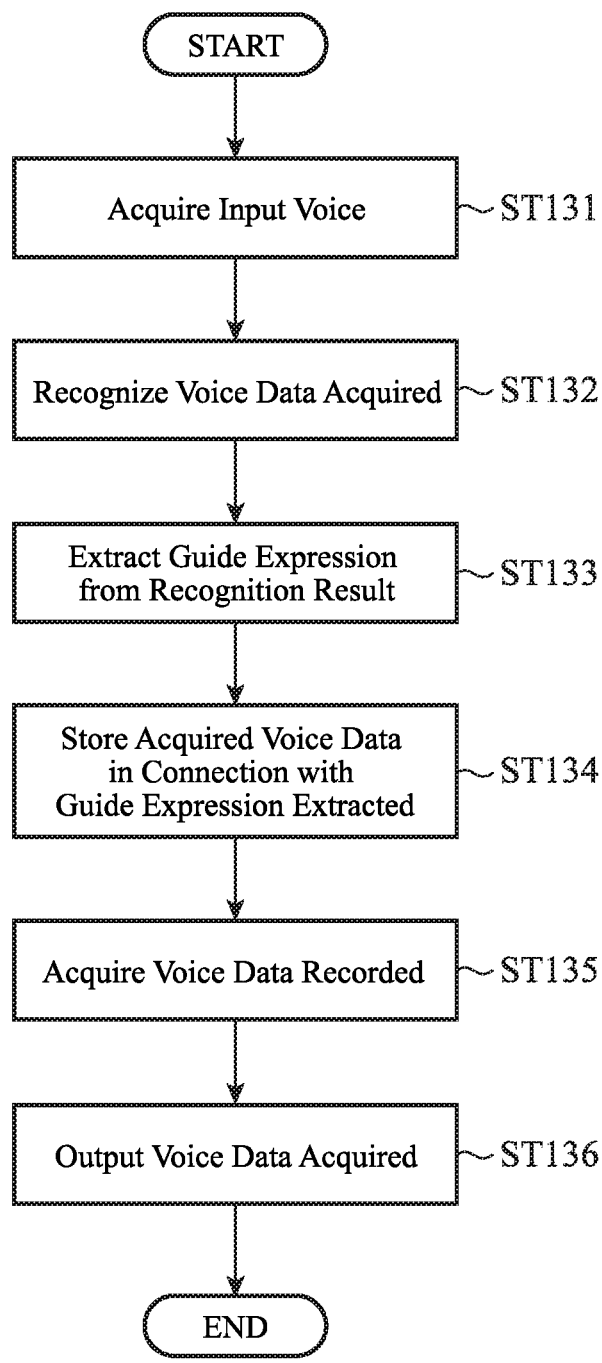
FIG. 27 is a flowchart showing the operation of the navigation apparatus of the embodiment 10.

FIG. 27 is a flowchart showing the operation of the navigation apparatus of the embodiment 10.

As for the processing from step ST131 to ST133, since it is the same as the processing from step ST01 to ST03 in the flowchart of FIG. 4 in the embodiment 1, its description will be omitted. Then, in the present embodiment 10, the voice recording unit 18 stores the voice data acquired by the voice acquiring unit 1 at step ST131 in connection with the guide expression extracted by the guide expression extracting unit 4 at step ST133 (step ST134). For example, when a talker says "turn right at the next intersection", the voice acquiring unit 1 acquires the voice data "turn right at the next intersection" and the guide expression extracting unit 4 extracts the guide expression "turn right" and "the next intersection". In this case, the voice recording unit 18 cuts out the voice data corresponding to "turn right" and the voice data corresponding to "the next intersection" from the voice data acquired, and stores the individual guide expressions in connection with the corresponding voice data.

Then, the guide expression presentation content acquiring unit 6 acquires from the voice recording unit 18 the voice data corresponding to the guide expression extracted by the guide expression extracting unit 4 (step ST135). For example, it can acquire the voice data corresponding to the "turn right" or acquire the voice data corresponding to both the "turn right" and "the next intersection". After that, the presentation control unit 7 outputs the recorded voice data acquired so that the voice output unit 22 like a speaker outputs it in voice (step ST136).

Incidentally, although it is also assumed in the present embodiment that it always carries out recognition of the speech content of the fellow passenger, a configuration is also possible which carries out the voice recognition only during a prescribed period (for example, during the period from the time when the fellow passenger starts guidance and pushes down a button for executing the voice recognition to the time when the button is released). In addition, a configuration is also possible which enables the user to decide whether to carry out the recognition always or for a prescribed period.

In addition, a configuration is also possible which enables a user to decide whether to employ the function of the voice recording unit 18 in the present embodiment 10 or not.

Figure 28:
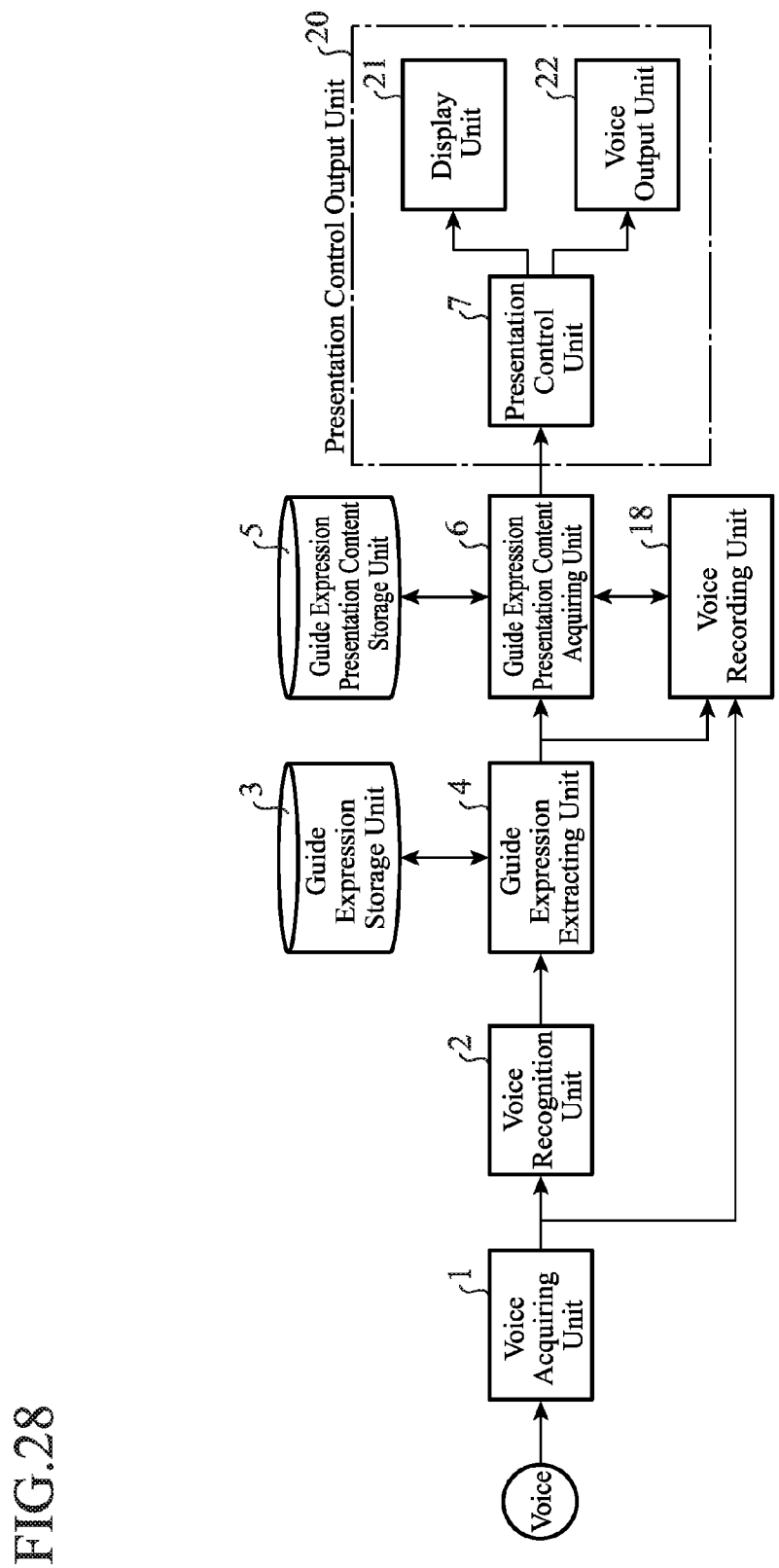
FIG. 28 is a block diagram showing another example of the navigation apparatus of the embodiment 10.

In addition, as shown in the block diagram of FIG. 28, a configuration is also possible which comprises the voice recording unit 18 in the block diagram of the embodiment 1 and so on, in which case it is also possible to enable a user to decide whether to employ the function of the voice recording unit 18 or not.

As described above, according to the present embodiment 10, it is configured in such a manner as to output invoice again the guide expression the talker such as a fellow passenger utters. Accordingly, it can prevent the misunderstanding of the driver and prevent the vehicle from going to the direction the talker does not intend.

Incidentally, although the present embodiment is described using an example of the navigation apparatus for a vehicle, a navigation apparatus in accordance with the present invention is applicable not only to a vehicle, but also to a mobile body including a person, vehicle, railroad, ship and aircraft. In particular, it relates to a navigation apparatus to be carried in a vehicle or on board, and is applicable to any apparatuses capable of carrying out navigation through voice conversation between a user and the apparatuses such as a portable navigation apparatus regardless of their form.

Incidentally, it is to be understood that a free combination of the individual embodiments, variations of any components of the individual embodiments or removal of any components of the individual embodiments are possible within the scope of the present invention.

INDUSTRIAL APPLICABILITY

A navigation apparatus in accordance with the present invention is applicable to an onboard navigation apparatus and portable navigation apparatus capable of performing navigation through voice conversation between a user and the apparatus.

DESCRIPTION OF REFERENCE SYMBOLS 1 voice acquiring unit, 2 voice recognition unit, 3 guide expression storage unit, 4 guide expression extracting unit, 5 guide expression presentation content storage unit, 6 guide expression presentation content acquiring unit, 7 presentation control unit, 8 map data storage unit, 9 vehicle position acquiring unit (position acquiring unit), 10 presentation position identifying unit, 11 presentation timing storage unit, 12 presentation timing control unit, 13 vehicle speed acquiring unit (speed acquiring unit), 14 guide expression eligibility deciding unit, 15 route re-setting unit, 16 cancellation/correction expression storage unit, 17 cancellation/correction expression extracting unit, 18 voice recording unit, 20 presentation control output unit, 21 display unit, 22 voice output unit, 31 navigation screen, 32 own-vehicle mark, 33 balloon, 34 graphics data, 35 text data, 36 red road, 37 thick road.

What is claimed is:
1. A navigation apparatus which includes a position acquiring unit that acquires the position of a mobile body, and which carries out guidance in accordance with map data and the position of the mobile body acquired by the position acquiring unit, the navigation apparatus comprising:
a voice acquiring unit that acquires input voice;
a voice recognition unit that executes voice recognition processing of voice data acquired by the voice acquiring unit;
a guide expression storage unit that stores one or more guide expressions;
a guide expression extracting unit that refers to the guide expression storage unit and extracts a guide expression indicating where or when to change a direction from amongst said one or more guide expressions based on a recognition result of the voice recognition unit;
a guide expression presentation content storage unit that stores a presentation content corresponding to each of said one or more guide expressions;
a guide expression presentation content acquiring unit that refers to the guide expression presentation content storage unit, and acquires, in accordance with the guide expression extracted by the guide expression extracting unit, the presentation content corresponding to the guide expression;
a presentation control output unit that outputs the presentation content acquired by the guide expression presentation content acquiring unit;
a cancellation/correction expression storage unit that stores an expression used at cancellation or correction; and
a cancellation/correction expression extracting unit that refers to the cancellation/correction expression storage unit and extracts an expression used for cancellation/correction in accordance with a recognition result of the voice recognition unit, wherein
the presentation control output unit i) stops outputting the presentation content when the cancellation/correction expression is extracted, or ii) when the cancellation/correction expression is extracted in a state in which a visual presentation content is output as the presentation content, cancels output of the visual presentation content.

2. The navigation apparatus according to claim 1, further comprising:
a presentation timing control unit that controls timing of outputting the presentation content by the presentation control output unit.

3. The navigation apparatus according to claim 2, wherein
the presentation timing control unit determines a guide point on said map data to which guidance is to be made using the guide expression extracted by the guide expression extracting unit, the position of the mobile body acquired by the position acquiring unit, and the map data, calculates a distance from the position of the mobile body to the guide point, and controls the timing in a manner that the presentation content is output when the distance becomes equal to or less than a prescribed value.

4. The navigation apparatus according to claim 2, further comprising:
a speed acquiring unit that acquires speed of the mobile body, wherein
the presentation timing control unit determines a guide point to which guidance is to be made using the guide expression extracted by the guide expression extracting unit, the position of the mobile body acquired by the position acquiring unit, and the map data, calculates not only a distance from the position of the mobile body to the guide point, but also time required to arrive at the guide point using the speed acquired by the speed acquiring unit, and controls the timing in a manner that the presentation content is output when the time required becomes equal to or less than a prescribed value.

5. The navigation apparatus according to claim 1, further comprising:
a cancellation/correction expression storage unit that stores an expression used at cancellation or correction; and
a cancellation/correction expression extracting unit that refers to the cancellation/correction expression storage unit and extracts an expression used for cancellation/correction in accordance with a recognition result of the voice recognition unit, wherein the presentation control output unit outputs, when the cancellation/correction expression is extracted, the presentation content which corresponds to the guide expression extracted after the cancellation/correction expression.

6. The navigation apparatus according to claim 1, further comprising:
a presentation position identifying unit that determines, when the presentation content is a visual presentation content, a place at which the visual presentation content is to be presented using the map data, the guide expression extracted by the guide expression extracting unit, and the position of the mobile body acquired by the position acquiring unit.

7. The navigation apparatus according to claim 1, wherein the presentation control output unit outputs, when the presentation content is a visual presentation content, the visual presentation content by displaying it in one of modes of turning it on and off, moving it and fade-in.

8. The navigation apparatus according to claim 1, wherein when the presentation content is a visual presentation content, the visual presentation content is provided by one of graphics display, text display, color alteration, magnitude alteration and a combination of them.

9. The navigation apparatus according to claim 1, further comprising:
a voice recording unit that records the voice data acquired by the voice acquiring unit in connection with the guide expression extracted by the guide expression extracting unit, wherein
the guide expression presentation content acquiring unit acquires the voice data stored in the voice recording unit as a corresponding presentation content.

10. A navigation program that causes a computer to function as:
a position acquiring unit that acquires the position of a mobile body;
a voice acquiring unit that acquires input voice;
a voice recognition unit that executes voice recognition processing of voice data acquired by the voice acquiring unit;
a guide expression storage unit that stores one or more guide expressions;
a guide expression extracting unit that refers to the guide expression storage unit and extracts a guide expression indicating where or when to change a direction from amongst said one or more guide expressions based on a recognition result of the voice recognition unit;
a guide expression presentation content storage unit that stores a presentation content corresponding to each of said one or more expressions;
a guide expression presentation content acquiring unit that refers to the guide expression presentation content storage unit, and acquires, in accordance with the guide expression extracted by the guide expression extracting unit, the presentation content corresponding to the guide expression; and
a presentation control output unit that outputs the presentation content acquired by the guide expression presentation content acquiring unit, wherein
the navigation program carries out guidance in accordance with map data and the position of the mobile body acquired by the position acquiring unit;
a cancellation/correction expression storage unit that stores an expression used at cancellation or correction; and
a cancellation/correction expression extracting unit that refers to the cancellation/correction expression storage unit and extracts an expression used for cancellation/correction in accordance with a recognition result of the voice recognition unit, wherein
the presentation control output unit i) stops outputting the presentation content when the cancellation/correction expression is extracted, or ii) when the cancellation/correction expression is extracted in a state in which a visual presentation content is output as the presentation content, cancels output of the visual presentation content.

11. A navigation apparatus which includes a position acquiring unit that acquires the position of a mobile body, and which carries out guidance in accordance with map data and the position of the mobile body acquired by the position acquiring unit, the navigation apparatus comprising:
a voice acquiring unit that acquires input voice;
a voice recognition unit that executes voice recognition processing of voice data acquired by the voice acquiring unit;
a guide expression storage unit that stores one or more guide expressions;
a guide expression extracting unit that refers to the guide expression storage unit and extracts a guide expression indicating where or when to change a direction from amongst said one or more guide expressions based on a recognition result of the voice recognition unit;
a guide expression presentation content storage unit that stores a presentation content corresponding to each of said one or more guide expressions;
a guide expression presentation content acquiring unit that refers to the guide expression presentation content storage unit, and acquires, in accordance with the guide expression extracted by the guide expression extracting unit, the presentation content corresponding to the guide expression;
a presentation control output unit that outputs the presentation content acquired by the guide expression presentation content acquiring unit;
a guide expression eligibility deciding unit that decides on whether the guide expression extracted by the guide expression extracting unit is eligible or not, wherein
the presentation control output unit stops i) outputting the presentation content when the guide expression eligibility deciding unit decides that the guide expression is ineligible, or ii) outputs a presentation content indicating that the guide expression is ineligible when the guide expression eligibility deciding unit decides that the guide expression is ineligible.

12. The navigation apparatus according to claim 11, further comprising:
a route re-setting unit that sets a route again when the guide expression eligibility deciding unit decides that the guide expression is ineligible.

13. The navigation apparatus according to claim 11, further comprising:
a route re-setting unit that sets a route again when the guide expression eligibility deciding unit decides that the guide expression is ineligible.

* * * * *